(12) United States Patent
Inoue

(10) Patent No.: US 9,435,884 B2
(45) Date of Patent: Sep. 6, 2016

(54) RADAR SYSTEM AND TARGET DETECTION METHOD

(71) Applicant: Panasonic Intellectual Property Management Co., Ltd., Osaka (JP)

(72) Inventor: Kenichi Inoue, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 0 days.

(21) Appl. No.: 14/667,318

(22) Filed: Mar. 24, 2015

(65) Prior Publication Data

US 2015/0198709 A1  Jul. 16, 2015

Related U.S. Application Data

(63) Continuation of application No. PCT/JP2014/004069, filed on Aug. 4, 2014.

(30) Foreign Application Priority Data

Aug. 29, 2013 (JP) ................................. 2013-177868

(51) Int. Cl.
  *G01S 13/50* (2006.01)
  *G01S 13/28* (2006.01)
  (Continued)

(52) U.S. Cl.
  CPC .............. *G01S 13/50* (2013.01); *G01S 7/285* (2013.01); *G01S 13/28* (2013.01); *G01S 13/346* (2013.01); *G01S 13/42* (2013.01); *G01S 13/52* (2013.01); *G01S 13/56* (2013.01)

(58) Field of Classification Search
  CPC .......... G01S 3/46; G01S 3/465; G01S 7/285; G01S 7/2813; G01S 7/292; G01S 13/28; G01S 13/34; G01S 13/50; G01S 13/52

USPC ............ 342/70–72, 113, 147, 156, 157, 175, 342/189, 192
See application file for complete search history.

(56) References Cited

U.S. PATENT DOCUMENTS 6,498,581 B1 * 12/2002 Yu .............................. G01S 3/74
  342/147
7,190,305 B2 * 3/2007 Isaji ........................ G01S 7/354
  342/107

(Continued)

FOREIGN PATENT DOCUMENTS

JP  2001-024564  1/2001
JP  2003-194919  7/2003

(Continued)

OTHER PUBLICATIONS

International Search Report of PCT application No. PCT/JP2014/004069 dated Nov. 4, 2014.

*Primary Examiner* — Peter Bythrow
(74) *Attorney, Agent, or Firm* — McDermott Will & Emery LLP

(57) ABSTRACT

A radar system according to the present disclosure includes a transmit antenna, a receive antenna composed of at least three receive antenna elements, a transmitter, a receiver that generates at least three first received signals by demodulating a plurality of reflected waves received by each of the receive antenna elements, a prefilter that estimates a plurality of main arrival angles representing directions of the targets using the at least three first received signals, a direction canceler that generates at least two first extracted signals by using the at least three first received signals to form nulls in eliminating arrival angles which are all the main arrival angles except an extracting arrival angle, and an image generator that analyzes Doppler frequency components around the extracting arrival angle using the at least two first extracted signals and calculates scattering-center arrival angles which each represent the arrival angle for each Doppler frequency component analyzed.

6 Claims, 19 Drawing Sheets

(51) Int. Cl.
*G01S 7/285* (2006.01)
*G01S 13/56* (2006.01)
*G01S 13/34* (2006.01)
*G01S 13/42* (2006.01)
*G01S 13/52* (2006.01)

(56) References Cited

U.S. PATENT DOCUMENTS

| | | | | |
|---|---|---|---|---|
| 8,686,894 | B2* | 4/2014 | Fukuda | G01S 3/48 342/107 |
| 8,717,230 | B1* | 5/2014 | Fischi | G01S 7/2813 342/159 |
| 8,907,841 | B2* | 12/2014 | Sahinoglu | G01S 7/292 342/159 |
| 2001/0015698 | A1* | 8/2001 | Tokoro | G01S 7/354 342/70 |
| 2005/0206556 | A1* | 9/2005 | Isaji | G01S 7/354 342/149 |
| 2006/0007036 | A1* | 1/2006 | Natsume | G01S 3/74 342/70 |
| 2009/0121916 | A1* | 5/2009 | Miyake | G01S 3/74 342/70 |
| 2009/0267822 | A1* | 10/2009 | Shinoda | G01S 7/352 342/70 |
| 2010/0019954 | A1* | 1/2010 | Mizutani | G01S 3/74 342/147 |
| 2010/0073216 | A1* | 3/2010 | Sakamoto | G01S 3/74 342/70 |
| 2011/0221628 | A1* | 9/2011 | Kamo | G01S 7/295 342/70 |
| 2012/0119938 | A1* | 5/2012 | Abe | G01S 7/35 342/107 |
| 2012/0218139 | A1* | 8/2012 | Suzuki | G01S 7/2813 342/189 |
| 2012/0293359 | A1* | 11/2012 | Fukuda | G01S 3/48 342/107 |
| 2013/0147656 | A1* | 6/2013 | Shirakawa | G01S 13/42 342/146 |
| 2013/0169471 | A1* | 7/2013 | Lynch | G01S 7/352 342/107 |
| 2014/0062763 | A1* | 3/2014 | Kishigami | G01S 13/42 342/158 |

FOREIGN PATENT DOCUMENTS

| | | |
|---|---|---|
| JP | 2010-237087 | 10/2010 |
| JP | 2011-226794 | 11/2011 |
| JP | 2013-096828 | 5/2013 |
| JP | 2013-120144 | 6/2013 |

* cited by examiner

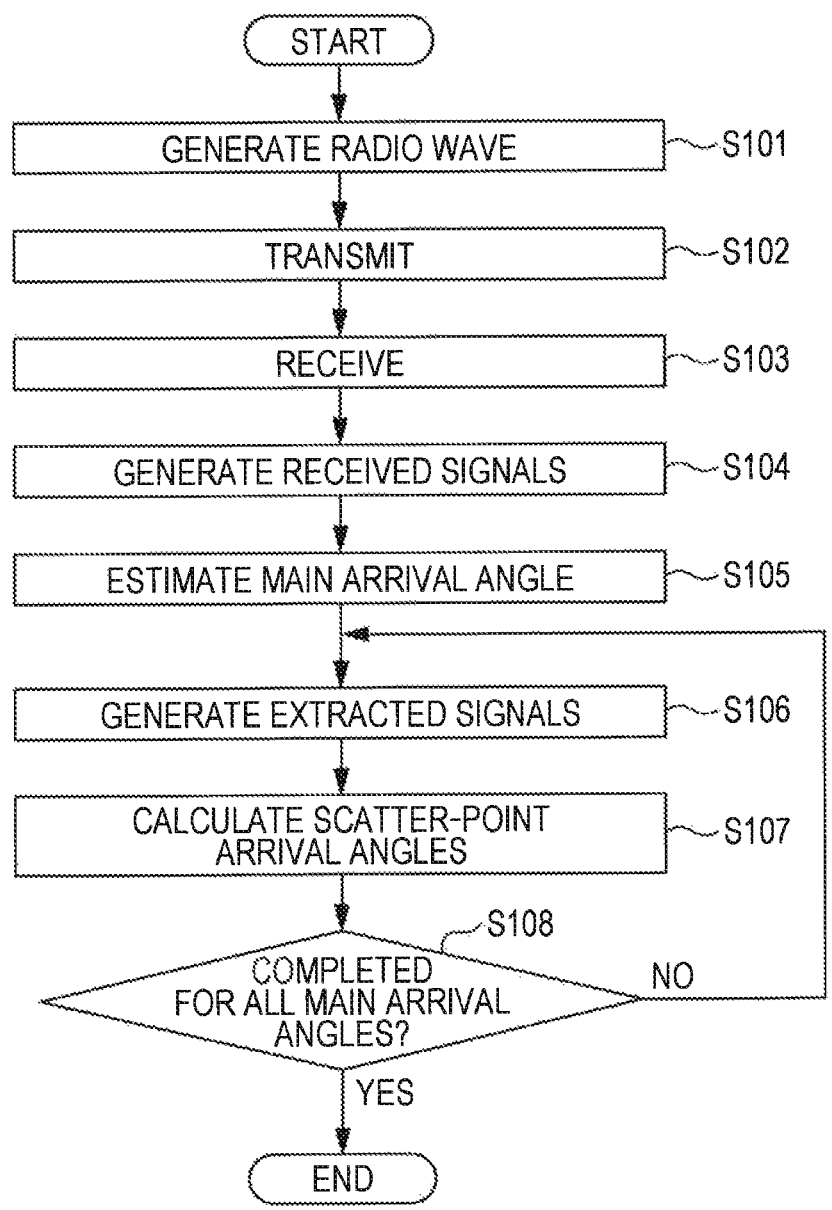

VIRTUAL NULL INAPPLICABLE

VIRTUAL NULL INAPPLICABLE

VIRTUAL NULL INAPPLICABLE

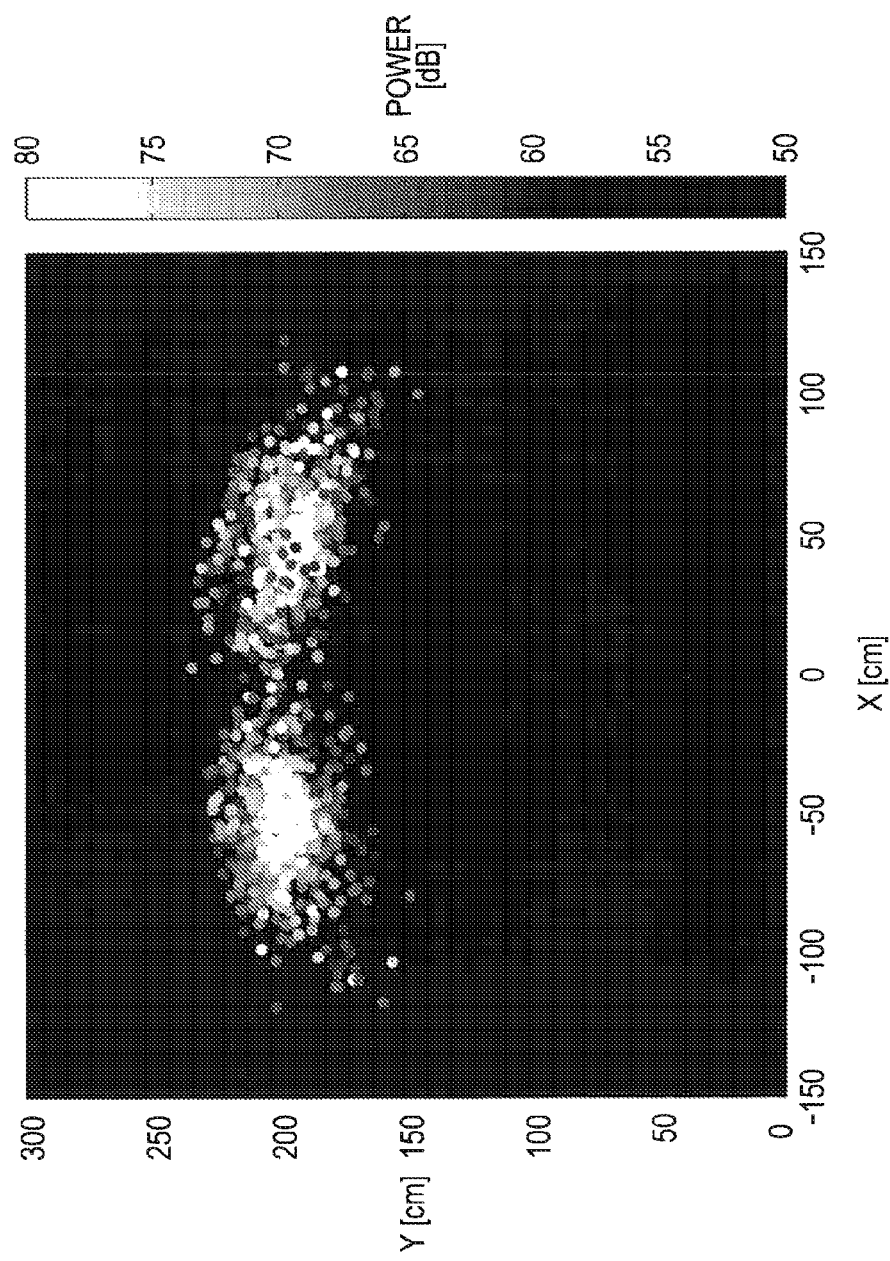

RADAR SYSTEM AND TARGET DETECTION METHOD

BACKGROUND

1. Technical Field

The present disclosure relates to a radar system and a target detection method for detecting multiple targets.

2. Description of the Related Art

Development of living environments or social infrastructures that allow people to live safely and comfortably has been an issue of increasing interest. Along with this trend, there is a need for sensing humans in everyday life for such purposes as monitoring of the behaviors or situation of an elderly person or a patient in a hospital room, or security such as tracking a person conducting suspicious acts among many pedestrians.

For these purposes, it is required to sense multiple persons separately from each other in an adverse environment rather than a favorable environment like a space with good visibility. For example, there is a need for sensing humans under abnormal conditions, such as an environment filled with smoke due to a fire, a dark place with no street light, or a space partitioned by walls or curtains. In short, it is required to detect humans with correct separation and track their actions in however adverse an environment. For decision of whether a detected target is a human being or not in such a situation, imaging for obtaining information from which the shape and characteristic motions of the target can be estimated is also as important as sensing.

One sensing means that can be used in such an environment is a radio wave sensor (a radar). Because of its ability to measure a relative velocity and a relative distance simultaneously and instantaneously, the radar has already been commercialized as sensing systems for vehicles in particular.

With a typical radar, however, interference occurs between targets when there are multiple target objects and they are close to each other in distance and/or speed of travel. This kind of interference is called correlated interference. In the presence of correlated interference, separation of individual signals and correct determination of their directions of arrival are not possible. Techniques for separating signals from multiple targets in such a situation include a radar device using a super-resolution antenna disclosed by Japanese Unexamined Patent Application Publication No. 2003-194919.

The configuration of the super-resolution antenna disclosed by Japanese Unexamined Patent Application Publication No. 2003-194919 is shown in FIG. 18. In the super-resolution antenna shown in FIG. 18, received signals corresponding to n pulses received by element antennas 11, 12, ..., 1M are separated into n frequency components by target signal separator circuits 21, 22, ..., 2M for received signals from the same range cell in a pulse sequence of each PRI, and the separated signals further branch into n signals and are weighted with different weight functions W0, W1, ..., Wn−1, which are set by a weight setting circuit 3. Output signals for which the same weight function is set are input from the target signal separator circuits 21, 22, ..., 2M to the same angle measurement computation circuit 41, 42, ..., 4n, each of which determines and outputs the directions of arrival of the signals. This enables accurate estimation of the directions of multiple targets having different Doppler frequencies in the same range cell.

SUMMARY

However, since a conventional radar device estimates the direction of arrival by separating a target object into multiple Doppler components beforehand with a Doppler filter bank, it rests on the premise that there is a difference in the relative velocities of the targets. For instance, when the target is an object that makes varying movements in different parts like a human being, that is, an object that has different Doppler components, even a single person as a target object contains many Doppler components in it. When there are multiple people, interference of Doppler components will also occur between targets.

Thus, although conventional radar devices are valued for the ability to reduce the influence of interference, they have the drawback of being unable to avoid interference in the first place when there are identical Doppler components.

One non-limiting and exemplary embodiment therefore provides a radar system and target detection method capable of detecting multiple targets as separate objects.

In one general aspect, the techniques disclosed here feature a radar system for detecting a plurality of targets, including a transmit antenna that includes at least one transmit antenna element and transmits a radio wave from each transmit antenna element; a receive antenna composed of at least three receive antenna elements for receiving a plurality of reflected waves resulting from the radio wave being reflected off the plurality of targets, the at least three receive antenna elements being arranged in a direction substantially parallel to a plane of travel of the targets; a transmitter that generates the radio wave to be transmitted from the transmit antenna element; a receiver that generates at least three first received signals corresponding to the at least three receive antenna elements by demodulating the plurality of reflected waves received by each of the receive antenna elements; a prefilter that estimates a plurality of main arrival angles representing directions of the targets relative to the radar system using the at least three first received signals; a direction canceler that generates at least two first extracted signals by using the at least three first received signals to form nulls in eliminating arrival angles, which are all main arrival angles except one main arrival angle as an extracting arrival angle among the plurality of main arrival angles, in directional characteristics of the receive antenna; and an image generator that analyzes Doppler frequency components around the extracting arrival angle using the at least two first extracted signals and calculates scattering-center arrival angles which each represent the arrival angle for each Doppler frequency component analyzed, in which the direction canceler sequentially changes the extracting arrival angle in response to a number of the plurality of main arrival angles estimated by the prefilter.

The radar system according to the present disclosure can detect multiple targets as separate objects.

It should be noted that these general or specific embodiments may be implemented as a system, a method, an integrated circuit, a computer program, or a computer-readable recording medium such as a CD-ROM, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 5 is a flowchart illustrating an example of the target detection method;

FIG. 14C is a diagram combining the results of detection of persons A and B shown in FIGS. 14A and 14B;

Figure 1:
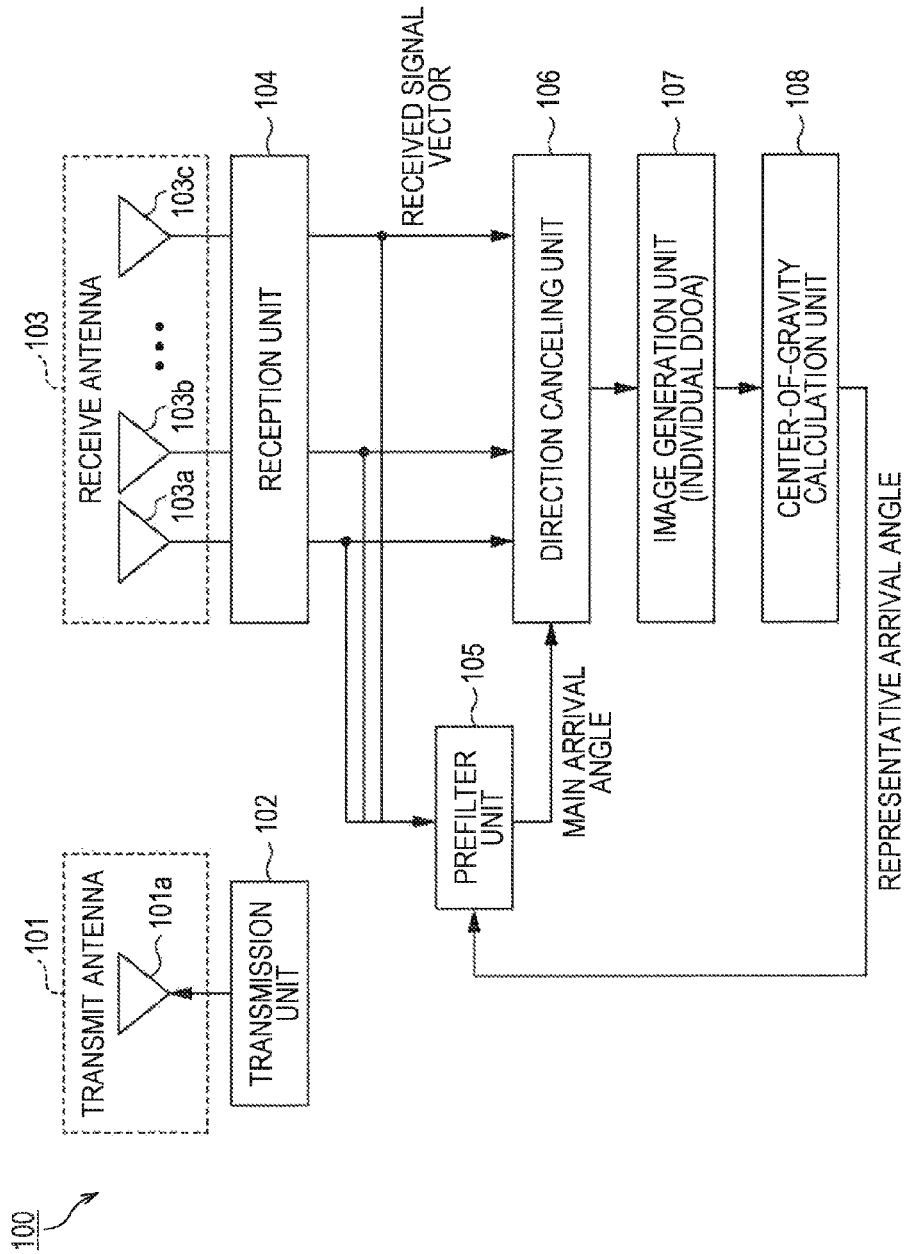
FIG. 1 is a block diagram showing the configuration of a human detection radar system according to a first embodiment.

DETAILED DESCRIPTION (Underlying Knowledge Forming Basis of the Present Disclosure)

The present inventor has found that the following problems were encountered in the conventional radar system mentioned in "Description of the Related Art".

Doppler and direction-of-arrival (DDOA), a method that combines speed detection based on Doppler shift with detection of direction-of-arrival (DOA) employing interference analysis, is known as an approach to measuring the shape and movements of a human being, such as a pedestrian, using a radar (a radio wave) (see A. Lin and H. Ling, "Frontal imaging of human using three element Doppler and direction-of-arrival radar", Electronics Letters, vol. 42, no. 11, pp. 660-661, (2006), for instance).

Although the DDOA method is able to detect a single person, it has difficulty in distinguishing individual persons due to mutual interference of received signals when two or more persons are present. For distinguishing individual targets when multiple targets exist, a method has been proposed in which reflected signals from target objects are frequency-separated through a Doppler filter bank and the direction of arrival is estimated for each frequency component (see Japanese Unexamined Patent Application Publication No. 2003-194919, for instance).

In the case of human beings as targets, for example, two pedestrians who are moving, however, the relative velocities of the two can be identical when they are running side by side, or if not running side by side, even between their body parts due to body movements. This makes it difficult to separate multiple persons positively with the conventional method.

The inventor accordingly has made a disclosure that is capable of detecting multiple targets as separate objects.

An aspect of the present disclosure provides a radar system for detecting a plurality of targets, including: a transmit antenna that includes at least one transmit antenna element and transmits a radio wave from each transmit antenna element; a receive antenna composed of at least three receive antenna elements for receiving a plurality of reflected waves resulting from the radio wave being reflected off the plurality of targets, the at least three receive antenna elements being arranged in a direction substantially parallel to a plane of travel of the targets; a transmitter that generates the radio wave to be transmitted from the transmit antenna element; a receiver that generates at least three first received signals corresponding to the at least three receive antenna elements by demodulating the plurality of reflected waves received by each of the receive antenna elements; a prefilter that estimates a plurality of main arrival angles representing directions of the targets relative to the radar system using the at least three first received signals; a direction canceler that generates at least two first extracted signals by using the at least three first received signals to form nulls in eliminating arrival angles, which are all main arrival angles except one main arrival angle as an extracting arrival angle among the plurality of main arrival angles, in directional characteristics of the receive antenna; and an image generator that analyzes Doppler frequency components around the extracting arrival angle using the at least two first extracted signals and calculates scattering-center arrival angles which each represent the arrival angle for each Doppler frequency component analyzed, in which the direction canceler sequentially changes the extracting arrival angle in response to a number of the plurality of main arrival angles estimated by the prefilter.

As described, at least two extracted signals are generated by forming nulls in all the main arrival angles except the extracting arrival angle in the directional characteristics of the receive antenna, and Doppler frequency components around the extracting arrival angle are analyzed using the at least two extracted signals to calculate scattering-center arrival angles. This enables separation of multiple reflected waves arriving from multiple targets. That is, mutual interference of received signals between targets can be suppressed. It is therefore possible to analyze Doppler frequency components for each one of reflected waves from multiple targets and calculate scattering-center arrival angles, which each represent the arrival angle for each Doppler frequency component analyzed. As a result, even for targets that are each composed of multiple parts, such as human beings, the directions of different parts of each target can be calculated. Accordingly, multiple targets can be detected as separate objects.

For example, the direction canceler may generate the at least two first extracted signals by canceling signals that are based on reflected waves that arrived at the receive antenna from eliminating arrival angles. The signals may be canceled by using at least two sets of two out of the at least three first received signals in different combinations to sequentially generate nulls in the eliminating arrival angles in the directional characteristics of the receive antenna for each of the at least two sets.

For example, the direction canceler may further form an additional null when the extracting arrival angle is a minimum or maximum of the plurality of main arrival angles, in which the extracting arrival angle substantially coincides with a midpoint between the direction of the additional null and the eliminating arrival angle that neighbors the extracting arrival angle.

This reduces the gain imbalance around the extracting arrival angle in the directional characteristics of the receive antenna and hence an imaging result with small distortion can be produced.

For example, the transmitter may generate the radio wave by modulating a carrier wave with a pseudo-noise code, and the receiver may generate the at least three first received signals by demodulating each of the plurality of reflected waves with the pseudo-noise code.

The distance to each individual target can thereby be estimated.

For example, the transmit antenna may have a first transmit antenna element and a second transmit antenna element that are arranged in a direction intersecting with the plane of travel as the at least one transmit antenna element; the transmitter may generate a first radio wave which is the radio wave to be transmitted from the first transmit antenna element by modulating a carrier wave with a first pseudo-noise code and generate a second radio wave which is the radio wave to be transmitted from the second transmit antenna element by modulating the carrier wave with a second pseudo-noise code which is orthogonal to the first pseudo-noise code; the receiver may generate the at least three first received signals by demodulating each of the plurality of reflected waves with the first pseudo-noise code and generate at least three second received signals by demodulating each of the reflected waves with the second pseudo-noise code; the direction canceler may further generate at least two second extracted signals using the at least three second received signals; and the image generator may further calculate the scattering-center arrival angles in a plane intersecting with the plane of travel using one of the at least two first extracted signals and one of the at least two second extracted signals.

This enables two-dimensional direction estimation and hence achieves three-dimensional imaging.

These general or specific aspects may also be implemented as a target detection method.

An aspect of the present disclosure provides a target detection method for detecting a plurality of targets using a radar system, including: generating a radio wave; transmitting the radio wave; receiving a plurality of reflected waves resulting from the radio wave being reflected off the plurality of targets with at least three receive antenna elements arranged in a direction substantially parallel to a plane of travel of the targets; generating at least three first received signals corresponding to the at least three receive antenna elements by demodulating the plurality of reflected waves received by each of the receive antenna elements; estimating a plurality of main arrival angles representing directions of the targets relative to the radar system using the at least three first received signals; generating at least two first extracted signals by using the at least three first received signals to form nulls in eliminating arrival angles, which are all main arrival angles except one main arrival angle as an extracting arrival angle among the plurality of main arrival angles, in directional characteristics of the receive antenna; analyzing Doppler frequency components around the extracting arrival angle using the at least two first extracted signals; and calculating scattering-center arrival angles which each represent the arrival angle for each Doppler frequency component analyzed, in which the generation of the at least two first extracted signals, the analysis of the Doppler frequency components, and the calculation of the scattering-center arrival angles are repeated with the extracting arrival angle sequentially changed in response to a number of the plurality of main arrival angles.

Embodiments of the present disclosure will now be described.

Note that the embodiments described below all illustrate general or specific examples. The numerical values, shapes, materials, components, the installation positions and connection forms of components, steps, the order of steps, and the like shown in the embodiments below are merely examples and are not intended to limit the present disclosure. Also, a component that is mentioned in the embodiments below and is not set forth in an independent claim presenting a broadest concept will be described as an optional component.

First Embodiment

FIG. 1 is block diagram showing the configuration of a human detection radar system 100 according to a first embodiment.

The human detection radar system 100 in the first embodiment is an example of a radar system for detecting multiple targets, human beings in particular. The human detection radar system 100 includes a transmit antenna 101, a receive antenna 103 which is composed of at least three elements and installed substantially parallel to the plane of travel of targets, a transmission unit 102 that generates a radio wave to be transmitted from the transmit antenna 101, a reception unit 104 that demodulates a radio wave reflected off a target (a human being) and generates a received signal, a prefilter unit 105 that estimates the directions of arrival (main arrival angles) of multiple reflected waves, a direction canceling unit 106 that uses an input signal from the receive antenna 103 to sequentially generate nulls in all the main arrival angles (eliminating arrival angles) except one main arrival angle (an extracting arrival angle) θ among multiple main arrival angles estimated by the prefilter unit 105 and generates a sub-interferometer, an image generation unit 107 that uses the sub-interferometer generated by the direction canceling unit 106 to analyze Doppler frequency components around the arrival angle θ and calculates the arrival angle (a scattering-center arrival angle) and the distance for each Doppler frequency based on the sub-interferometer, and a center-of-gravity calculation unit 108. The transmission unit 102, the reception unit 104, the prefilter unit 105, the direction canceling unit 106 and the image generation unit 107 correspond to the transmitter, the receiver, the prefilter, the direction canceler and the image generator of the present disclosure, respectively.

The plane of travel of targets is supposed to be a horizontal plane. Even if the targets themselves do not move a long distance, the bottom face of a space in which multiple targets are present is imagined and the bottom face is supposed to be a horizontal plane. The center-of-gravity calculation unit 108 is optional.

The components will be described below.

The transmit antenna 101 radiates (transmits) a radio wave into a space in which the targets are present. The transmit antenna 101 has at least one transmit antenna element 101a, and each transmit antenna element 101a radiates a radio wave. The transmit antenna element 101a may be a patch antenna or a monopole antenna, for example. The radio wave to be radiated by the transmit antenna element 101a is generated by modulation of a carrier wave in the transmission unit 102.

The receive antenna 103 receives a reflected wave reflected off a target. The receive antenna 103 is composed of at least three receive antenna elements 103a, 103b, 103c. The three receive antenna elements 103a, 103b, 103c are disposed at equal spacings in one dimension. Specifically, the three receive antenna elements 103a, 103b, 103c are arranged in a row substantially parallel to the plane of travel of targets and equally spaced.

An example of the spacing between the receive antenna elements 103a, 103b, 103c is a length from 0.5 times to 1 times the wavelength of the radio wave transmitted from the transmit antenna 101.

As described above, the radio wave radiated from the transmit antenna 101 is reflected by multiple targets and multiple reflected waves resulting from the radio wave being reflected off the targets are received by the receive antenna elements 103a, 103b, 103c.

The minimum distance between the transmit antenna 101 and the receive antenna 103 may be sufficiently shorter than the distances to targets that are typically assumed for the human detection radar system 100.

Making the minimum distance between the transmit antenna 101 and the receive antenna 103 sufficiently shorter than the distances from the human detection radar system 100 to the targets permits a reflected wave to be regarded as a plane wave (parallel incidence), so that only the phase difference of the interferometer has to be considered in calculation of the direction of arrival.

The transmission unit 102 modulates a carrier wave having a prescribed center frequency using a modulation signal to generate a radio wave. A storage included in the transmission unit 102 holds a predetermined modulation signal. That is, the transmission unit 102 generates a radio wave to be transmitted from the transmit antenna element 101a.

An example of the center frequency of the carrier wave is several tens of GHz. More specific examples of the center frequency are 26 GHz, 60 GHz, and 79 GHz.

The modulation signal used for modulation may be a pseudo-noise code, for example. As a pseudo-noise code, a code from the M-sequence system having multiple codes orthogonal to each other may be used among others. Use of a pseudo-noise code as the modulation signal makes the human detection radar system 100 less susceptible to the influence of radio communication devices other than itself.

In modulation using a pseudo-noise code, the signal spectrum of the carrier wave is spread. Accordingly, a pseudo-noise code may also be referred to as "spreading code" and modulation of a carrier wave using a pseudo-noise code may also be referred to as "spreading" hereinbelow.

The reception unit 104 accepts reflected radio waves received by the receive antenna 103. The reception unit 104 performs detection using a reflected radio wave, the modulation signal, and the carrier wave. More specifically, the reception unit 104 detects the reflected radio wave using the same carrier wave as the one used in the transmission unit 102 while delaying the modulation signal and demodulates the result of the detection while delaying the same pseudo-noise code to thereby calculate a correlation function. In other words, by demodulating multiple reflected waves received by the receive antenna elements 103a, 103b, 103c, the reception unit 104 generates at least three received signals (the first received signals) corresponding to the at least three receive antenna elements 103a, 103b, 103c.

When a pseudo-noise code is used as the modulation signal, this process is equivalent to calculating the correlation function between the radio wave radiated from the transmit antenna element 101a and the reflected wave received by each of the receive antenna elements 103a, 103b, 103c. In a spread spectrum scheme using a pseudo-noise code as the modulation signal, therefore, the amount of delay of the pseudo-noise code corresponding to the output peak of the correlation function is proportional to the distance to the target.

For the pseudo-noise code, a code rate of 250 Mbps, 500 Mbps, 1.25 Gbps, 2.5 Gbps, and so forth may be chosen, for example, and the unique distance resolution in distance measurement may correspondingly be 60 cm, 30 cm, 12 cm, 6 cm, and so forth, respectively. The distance to the target can be determined by multiplying the aforementioned amount of delay by the unique distance resolution as a proportionality factor.

Before describing the detailed features of the human detection radar system 100 in this embodiment, the principle of the target direction detection implemented by the human detection radar system 100 using the DDOA method will be explained.

Figure 2:
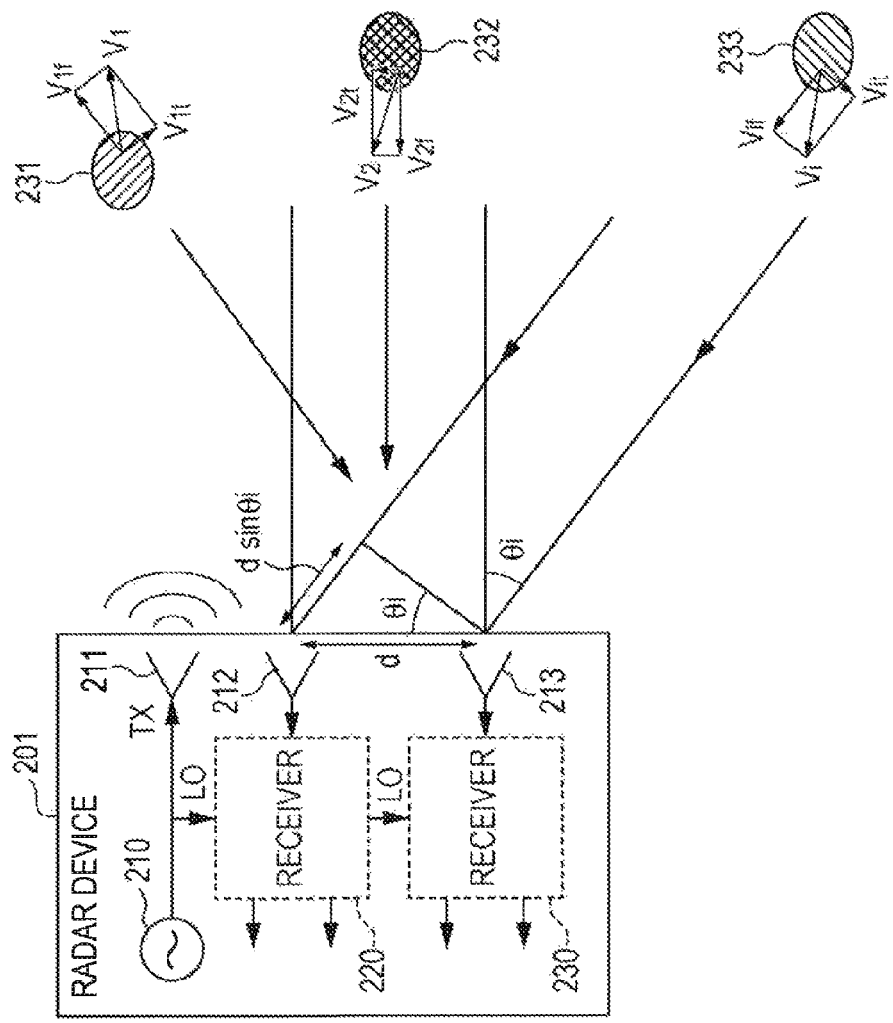
FIG. 2 is a diagram illustrating the principle of the DDOA method.

FIG. 2 is a diagram illustrating the principle of the DDOA method.

A radar device 201 shown in FIG. 2 corresponds to the human detection radar system 100 in the first embodiment. For facilitating the understanding of the DDOA method, the radar device 201 is supposed to have two receive antennas equivalent to the receive antenna elements 103a, 103b, 103c. To be specific, the radar device 201 includes a transmitter 210 corresponding to the transmission unit 102, a receiver 220 and a receiver 230 corresponding to the reception unit 104, a transmit antenna 211 corresponding to the transmit antenna element 101a, and receive antennas 212 and 213 corresponding to the receive antenna elements 103a, 103b, 103c.

The radar device 201 detects targets 231, 232, and 233. The transmitter 210 emits a detection radio wave of a certain frequency. The receiver 220 and the receiver 230 receive reflected waves resulting from the detection radio wave being reflected off the targets 231, 232, 233.

When the targets 231, 232, 233 are moving at certain radial velocities relative to the radar device 201, the frequencies of reflected waves received by the receiver 220 and the receiver 230 shift by frequencies corresponding to the radial velocities relative to the frequency of the detection radio wave radiated from the transmit antenna 211. From the shifted frequencies (Doppler frequencies), the respective radial velocities of the targets 231, 232, 233 can be determined.

The term "radial velocity" refers to the component of velocity along the direction from the radar device 201 toward the target within the velocities of the targets 231, 232, 233. In other words, the radial velocity is the relative component of velocity of the target 231 to 233 with respect to the radar device 201. More specifically, when the velocities of the targets 231, 232, 233 are represented by $V_1$, $V_2$, and $V_i$ as shown in FIG. 2, the radial velocities of the targets 231, 232, 233 are $V_{1f}$, $V_{2f}$, and $V_{if}$ which are the velocities $V_1$, $V_2$, and $V_i$ resolved along the direction from the radar device 201 towards the target 231, 232, 233.

That is, the radar device 201 uses the frequencies of reflected waves received by the receiver 220 and the receiver 230 relative to the frequency of the detection radio wave to determine the radial velocities $V_{1f}$, $V_{2f}$, and $V_{if}$ of the targets 231, 232, 233.

The radar device 201 has two sets of reception systems including receive antennas and receivers corresponding to the receive antennas as illustrated in FIG. 2. The receive antenna 212 and the receive antenna 213 are disposed at different positions.

Consequently, the distance from each target 231, 232, 233 to the receive antenna 212 is different from the distance from that target 231, 232, 233 to the receive antenna 213.

This difference in the distances from the target 231, 232, 233 to the two receive antennas 212 and 213 enables detection of the directions of the targets 231, 232, 233 (DOA). The principle of the detection of direction (DOA) will be described more specifically.

In FIG. 2, since the target 233, for example, is present at a position closer to the receive antenna 213 than to the receive antenna 212, a reflected wave from the target 233 reaches the receive antenna 213 before it reaches the receive antenna 212. Accordingly, when the reflected wave received at the receive antenna 212 is compared to the reflected wave received at the receive antenna 213, the reflected wave received at the receive antenna 212 is delayed in phase with respect to the reflected wave received at the receive antenna 213. Suppose here that the target 233 is positioned in direction θi with respect to the front sides of the receive antenna 212 and the receive antenna 213 and that the two receive antennas 212 and 213 are positioned at a distance d from each other. Under these conditions, the phase difference between the reflected wave received by the receive antenna 212 and the reflected wave received by the receive antenna 213 is represented by Equation 1. In the equation, φ1 is the phase of the reflected wave received by the receive antenna 212, φ2 is the phase of the reflected wave received by the receive antenna 213, and λ is the wavelength of the detection radio wave emitted from the transmit antenna 211.

$$\phi2-\phi1 = 2\pi d \times \sin\theta/\lambda \quad (1)$$

Modifying Equation 1 yields Equation 2 below. That is, the direction θ of the target 233 can be determined from the phase difference φ2−φ1 between the two reflected waves received by the two receive antennas 212 and 213.

$$\theta = \sin^{-1}\{(\phi2-\theta1)\lambda/(2\pi d)\} \quad (2)$$

This is how the DOA can be estimated using interference analysis.

In the DDOA method, the Doppler frequencies of the individual targets are also detected. By then performing the DOA on signals having Doppler frequencies corresponding to each target among the reflected waves received by the receive antennas, the direction of the corresponding target can be determined. The radar device 201 thus identifies multiple targets based on Doppler frequencies and then determines the direction of each target.

Since the DDOA method based on such a principle separates reflected waves from multiple targets 231, 232, 233 into multiple Doppler components and estimates the direction of arrival for each separated Doppler component, it is based on the premise that there are differences in the relative velocities of the targets 231, 232, 233. In other words, it is premised on detection of multiple rigid bodies as targets that move at different speeds.

Consider now detecting an object that makes varying movements in different parts thereof such as a human being as the target. The body of a human being is composed of multiple parts that move at different speeds, such as the arms, the legs, the trunk, and the head. Accordingly, Doppler components observed with the DDOA method are frequencies reflecting the movements of the individual parts.

That is, in the case of detection of multiple persons as targets, presence of many Doppler components in each individual target can lead to occurrence of interference of Doppler components between targets, that is, a situation where multiple targets cannot be detected as separate objects.

In the human detection radar system 100 according to this embodiment, therefore, a main direction of arrival, which is the dominant direction of arrival of reflected waves from each target, is estimated in the prefilter unit 105. More specifically, as the main direction of arrival, the prefilter unit 105 estimates a direction calculated with a human being making body and hand gestures treated as a single rigid body. The direction canceling unit 106 then suppresses signals that are based on reflected waves which arrived from directions other than the desired representative direction of arrival among multiple main directions of arrival, thereby extracting only those signals that are based on reflected waves from the desired main direction of arrival. The image generation unit 107 then uses the thus extracted signal to perform the DDOA method described above to obtain an estimated image of only the desired target (imaging of the target).

The prefilter unit 105, the direction canceling unit 106, the image generation unit 107, and the center-of-gravity calculation unit 108 will be described below.

The prefilter unit 105 uses at least three received signals to estimate multiple main arrival angles, which are the directions of the targets relative to the human detection radar system 100. That is, the prefilter unit 105 estimates the directions of reflected waves from each target using three received signals corresponding to the receive antenna elements 103a, 103b, and 103c generated by the reception unit 104.

More specifically, the direction of arrival of a reflected wave can be estimated using methods such as estimation of signal parameters via rotational invariance techniques (ESPRIT) and multiple signal classification (MUSIC). The ESPRIT and MUSIC methods obtain a correlation matrix for received signals generated by the reception unit 104 and determine an eigenvalue to calculate the direction.

Instead of estimating the direction by the ESPRIT or other methods each time a reflected wave is received, the target may be tracked using a prediction means such as a Kalman filter once its initial position has been obtained. In such an implementation, individual scattering-centers from Doppler imaging may be used to determine a single center (the center of gravity) per target, which may be used for tracking.

As another alternative, results of direct estimation of direction such as by the ESPRIT method may be intermittently incorporated in addition to prediction with a Kalman filter and the predicted direction of arrival may be corrected over time. This method has the advantage of minimizing matrix calculations with high computation load which are required in the ESPRIT method and the like.

The direction thus estimated by the prefilter unit 105 is called a main arrival angle herein. The main arrival angle is equivalent to treating a human being making body and hand gestures as a rigid body, and can be considered to yield information on a body part that has high reflection intensity (for example, the trunk).

If there is interference between targets already in the phase of determination of the main arrival angle, an algorithm known as spatial smoothing could be employed. Alternatively, predicted values computed with a Kalman filter or the like may be adopted.

The direction canceling unit 106 generates at least two extracted signals (the first extracted signals) by using at least three received signals generated by the reception unit 104 to form nulls in eliminating arrival angles, which are all the main arrival angles except one main arrival angle as the extracting arrival angle among multiple main arrival angles in the directional characteristics of the receive antenna 103. In this manner, the direction canceling unit 106 uses received signals corresponding to the receive antenna elements 103a, 103b, 103c output from the reception unit 104 to generate at least two extracted signals that are based on reflected waves from one of the multiple targets. This process of generating two extracted signals using at least three received signals is called an elimination process. The details of the elimination process will be discussed later.

The direction canceling unit 106 also performs the elimination process sequentially changing the extracting arrival angle in response with the number of the main arrival angles estimated by the prefilter unit 105.

The image generation unit 107 uses at least two extracted signals generated by the direction canceling unit 106 to analyze Doppler frequency components around the extracting arrival angle and calculates scattering-center arrival angles, which each represent the arrival angle for each Doppler frequency component analyzed.

More specifically, the image generation unit 107 uses the phase difference between the two extracted signals output from the direction canceling unit 106 to calculate the direction of each part of a target relative to the human detection radar system 100. That is, the image generation unit 107 analyzes the Doppler frequency components of the target that is present in the direction of the extracting arrival angle among targets which make varying movements in different parts thereof. Doppler frequency components analyzed in this way are analyzed as a fine spectrum that reflects the movements of individual parts of a target.

The image generation unit 107 accordingly calculates the direction of arrival for each Doppler frequency component by performing the DOA for each Doppler frequency component analyzed. That is, the image generation unit 107 calculates scattering-center arrival angles, which are the arrival angles of reflected waves from individual parts of the target present in the direction of the extracting arrival angle.

The image generation unit 107 thereby can estimate the direction of each part of the target present in the direction of the extracting arrival angle. In other words, multiple targets can be detected as separate objects, or specifically, the target present in the direction of the extracting arrival angle can be detected separately from the other targets.

The image generation unit 107 also analyzes the Doppler frequency components around the extracting arrival angle and calculates scattering-center arrival angles as described above each time the direction canceling unit 106 changes the extracting arrival angle. This enables estimation of the directions of individual parts of each one of multiple targets. Accordingly, each one of the multiple targets can be detected separately from the other targets.

The image generation unit 107 further maps scattering-center arrival angles, which are directions calculated for different parts of each target detected, and uses the result of the mapping to form an estimated image of the target. When a pseudo-noise code is used as the modulation signal, the distance may be additionally mapped for each part of the target.

The center-of-gravity calculation unit 108 calculates a representative direction of arrival, which is the representative direction of arrival of reflected waves from each target, using the scattering-center arrival angles of the target calculated by the image generation unit 107. For example, the center-of-gravity calculation unit 108 calculates the average of scattering-center arrival angles of the target as the representative direction of arrival.

The center-of-gravity calculation unit 108 may either weight the direction of each part of the target with the strength of reflected waves from that direction and calculate the average of weighted directions as the representative direction of arrival, or calculate the center-of-gravity direction of the estimated image of the target formed by the image generation unit 107 as the representative direction of arrival.

[Elimination Process]

Figure 3A:
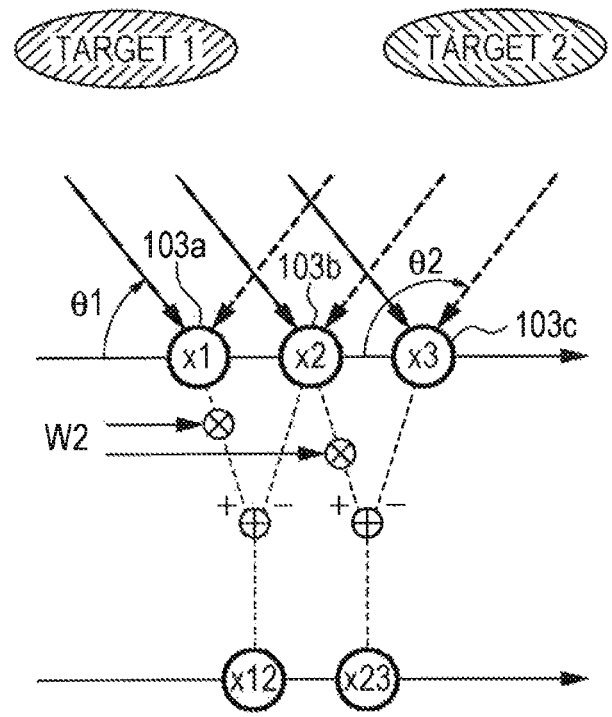
FIG. 3A is a diagram for describing an elimination process performed in a direction canceling unit.
Figure 3B:
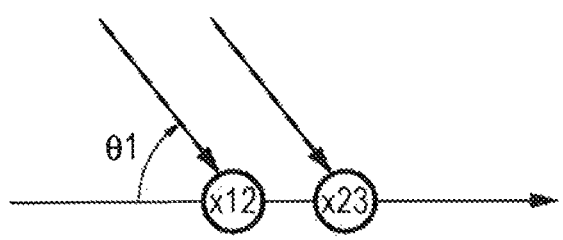
FIG. 3B is a diagram for describing the elimination process performed in the direction canceling unit.
Figure 3C:
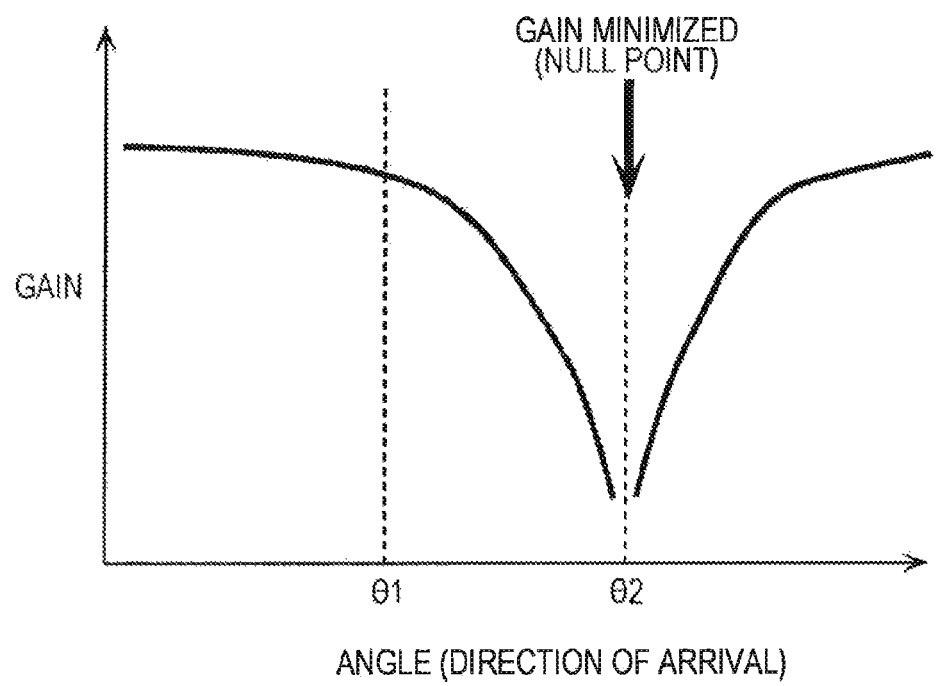
FIG. 3C is a diagram for describing the elimination process performed in the direction canceling unit.

Next, the processing performed in the direction canceling unit 106, namely the elimination process performed by the direction canceling unit 106, will be described in detail. FIGS. 3A to 3C are diagrams for describing the elimination process performed in the direction canceling unit 106.

The direction canceling unit 106 performs signal processing for extracting only those signals that arrive from a desired target when there are multiple targets and suppressing signals arriving from the other targets.

If a pair of extracted signals for the desired target having different phases (a pair of extracted signals) can be prepared, the signals can be used to construct an interferometer. With the interferometer, a DDOA process using only signals that arrived from the desired target may be performed to obtain an estimated image of only the desired target (imaging of the target).

The direction canceling unit 106 accordingly suppresses unwanted signals and also executes processing for generating a pair of extracted signals (an extracted signal vector), and outputs the extracted signal vector. This whole process is called constituting a "sub-interferometer".

Note that the direction of a target with reference to the receive antenna is called "main arrival angle", the direction of a desired target among the respective main arrival angles of multiple targets is called "extracting arrival angle", and main arrival angles other than the extracting arrival angle are called "eliminating arrival angles".

The point of this embodiment lies in the procedure for mapping scattering-centers (scattering-center arrival angles) for the desired target to obtain its estimated image by applying the DDOA method only to directions around the extracting arrival angle.

[Two-Target Case]

For the sake of simplicity, the flow of the procedure will be described for the case of two targets and then for a more general case.

FIG. 3A illustrates a case in which a target 1 and a target 2 are present. The receive antenna elements 103a, 103b, and 103c receive reflected signals (incoming signals) reflected off the target 1 and the target 2. The main arrival angles of targets 1 and 2 are represented by $\theta 1$ and $\theta 2$, respectively. In the example illustrated, only the target 1 is to be extracted, with $\theta 1$ being the extracting arrival angle and $\theta 2$ being an eliminating arrival angle.

The received signal vector for a receive antenna linear array which represents the receive antenna 103 composed of the receive antenna elements 103a, 103b, and 103c is denoted as $(x1, x2, x3)^T$, where T means transposition.

The spacing (linear and equal) between receive antenna elements is represented by d, and the wave number is represented by $\kappa$ ($=2\pi/\lambda$, where $\lambda$ is the wavelength of the radio wave).

The phase differences $\alpha 1$, $\alpha 2$ between neighboring elements relative to the incoming signals from arrival angles $\theta 1$, $\theta 2$ satisfy the two equations shown in Equation 3 below.

$$\alpha 1 = \kappa \cdot d \cdot \sin(\theta 1)$$

$$\alpha 2 = \kappa \cdot d \cdot \sin(\theta 2) \qquad (3)$$

That is, for the purpose of description, phase relationships are defined as shown by the four equations in Equation 4 below when represented separately per incoming signal component. Here, the symbol "$x|\theta$" represents the $\theta$-direction component of x.

For the $\theta 1$-direction component, $$x2|\theta 1 = x1|\theta 1 \cdot \exp(j \cdot \alpha 1)$$

$$x3|\theta 1 = x2|\theta 1 \cdot \exp(j \cdot \alpha 1)$$

for the $\theta 2$-direction component, $$x2|\theta 2 = x1|\theta 2 \cdot \exp(j \cdot \alpha 2)$$

$$x3|\theta 2 = x2|\theta 2 \cdot \exp(j \cdot \alpha 2) \qquad (4).$$

In order to make the valid range of the arrival angle wide, spacing d may be $d=\lambda/2$ or $\lambda/2 \leq d < \lambda$. Since the arrival angle is a periodic function, setting of $\lambda/2 \leq d < \lambda$ can make the width of the period of the arrival angle periodic function large.

Here, define coefficients w1, w2 as indicated by the two equations in Equation 5 below, where j is the imaginary unit.

$$w1 = \exp(j \cdot \alpha 1)$$

$$w2 = \exp(j \cdot \alpha 2) \qquad (5)$$

Substituting Equation 5 into Equation 4, Equation 4 can be written as the four equations in Equation 6 below.

For the $\theta 1$-direction component, $$x2|\theta 1 = x1|\theta 1 \cdot w1$$

$$x3|\theta 1 = x2|\theta 1 \cdot w1,$$

for the $\theta 2$-direction component, $$x2|\theta 2 = x1|\theta 2 \cdot w2$$

$$x3|\theta 2 = x2|\theta 2 \cdot w2 \qquad (6).$$

Further, by the two equations shown in Equation 7 below, new signals x12, x23 are defined.

$$x12 = x1 \cdot w2 - x2$$

$$x23 = x2 \cdot w2 - x3 \qquad (7)$$

This calculation acts to cancel the signal components with phase difference $\alpha 2$ present between x1 and x2 and between x2 and x3.

That is, when Equation 6 is substituted into Equation 7 and each component is calculated, phase relationships are represented by the four equations shown in Equation 8 below when $\alpha 1 \neq \alpha 2$.

For the $\theta 1$-direction component, $$x12|\theta 1 = x1|\theta 1 \cdot (w2 - w1) \neq 0$$

$$x23|\theta 1 = x2|\theta 1 \cdot (w2 - w1) \neq 0$$

for the $\theta 2$-direction component, $$x12|\theta 2 = x1|\theta 2 \cdot (w2 - w2) = 0$$

$$x23|\theta 2 = x2|\theta 2 \cdot (w2 - w2) = 0 \qquad (8).$$

FIG. 3B is a diagram schematically showing the directions of arrival of the signals x12, x23 shown in Equation 8. As shown in FIG. 3B, for both of the signals x12, x23, signals arriving from the direction of angle $\theta 2$ are suppressed.

FIG. 3C is a schematic representation of the directional characteristics of the receive antenna linear array in this situation, showing that it has a pattern in which the gain at angle $\theta 2$ is the minimum (a null). This is called an elimination (canceling) process for $\theta 2$.

In signals x12 and x23, therefore, the signal component from arrival angle $\theta 2$ is suppressed, resulting in only the signal from arrival angle $\theta 1$ being extracted. The signals x12 and x23 are each called an extracted signal, and the pair formed by the signals x12 and x23 is called an extracted signal vector.

At the same time, the extracted signal vector $(x12, x23)^T$ also makes a sub-interferometer with spacing d for received signals only from the arrival angle $\theta 1$.

In this manner, the direction canceling unit 106 uses three received signals x1, x2, x3 corresponding to the three receive antenna elements 103a, 103b, 103c output from the reception unit 104 to generate two extracted signals based on reflected waves from the target 1 out of the two targets 1 and 2. That is, the direction canceling unit 106 generates the extracted signal vector $(x12, x23)^T$ using the received signal vector $(x1, x2, x3)^T$.

Note that although extraction of only the target 1 in the $\theta 1$ direction was described above, extraction of the target 2 in the $\theta 2$ direction can be similarly handled.

By performing Doppler DOA signal processing using the extracted signal vector, which is the set of these new received signals $(x12, x23)^T$, as a sub-interferometer, an estimated image of only the target 1 in the direction of the extracting arrival angle $\theta 1$ can be obtained. An estimated image of the target 2 in the direction of the extracting arrival angle $\theta 2$ can be obtained in a similar procedure.

[A Case with Generalized Number of Targets]

The flow of processing has been described thus far for the case of two targets for the sake of simplicity. Next, the general feasibility of this procedure regardless of the numbers of receive antenna elements and targets will be demonstrated using equations. The description supposes that k≤n−1, where n is the number of receive antenna elements and k is the number of targets.

The number of receive antenna elements is denoted by n and a received signal vector (a column vector) x is defined as in Equation 9 below.

$$X = (x_1, x_2, \ldots, x_n)^T \qquad (9)$$

Calculation for shifting received signals by an amount equivalent to one element can be carried out with a shift matrix U with (k+1) rows×(k+1) columns shown in Equation 10.

$$U \equiv \begin{bmatrix} 0 & 1 & 0 & & \\ & 0 & 1 & \ddots & \\ & & 0 & \ddots & 0 \\ & & & \ddots & 1 \\ & & & & 0 \end{bmatrix} \qquad (10)$$

Figure 4:
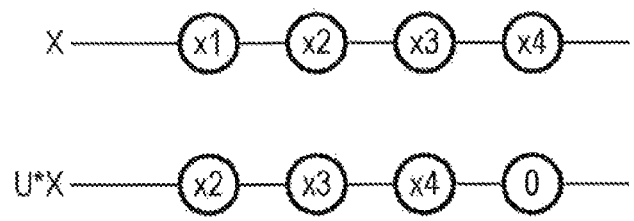
FIG. 4 is a diagram illustrating received signals shifted by an amount equivalent to one antenna element.

Here, the set of x and U·x in the same row represents a received signal pair formed by neighboring elements as shown in FIG. 4. This is defined as the initial received signal vector x0. FIG. 4 is a diagram illustrating received signals shifted by an amount equivalent to one element.

Next, given k targets, the extracting arrival angle is defined as θm and the eliminating arrival angle is defined as θi (i=1, 2, . . . , k, i≠m). Supposing that the eliminating arrival angle is θi and the phase difference between the neighboring elements in that direction is αi, setting the aforementioned appropriate coefficient wi to exp(j·αi) cancels signals between the neighboring elements, allowing the signal from the θi direction to be eliminated or suppressed (j is the imaginary unit). This is equivalent to forming a null for that direction in the directional characteristics of the receive antenna 103.

This is a process to define matrix Ai as shown in Equation 11 below and multiply the received signal vector x by (Ai−U).

$$A_i \equiv \exp(j\alpha_i)I \qquad (11)$$

Defining matrix Gi again as shown in Equation 12 below, one step of elimination is Gi·x.

$$G_i \equiv A_i - U \qquad (12)$$

Further, for Gi·x after elimination, an elimination matrix Ri with (k+1) rows and (k+1) columns in which zeros are set in order to invalidate the signal corresponding to one element that has decreased due to the elimination process is defined as shown in Equation 13 below. The elimination matrix Ri is a unit matrix with (k+1) rows and (k+1) columns in which the diagonal elements in the lowermost row to the i-th row are set to zeros. Setting zeros without reducing the size of the signal vector is convenient for description of matrix calculations because the size of the vector remains unchanged.

$$R_i \equiv \begin{bmatrix} 1 & 0 & & & \\ 0 & 1 & \ddots & & O \\ & 0 & \ddots & 0 & \\ & & \ddots & 1 & \\ \hline & O & & & O \end{bmatrix} \qquad (13)$$

Consequently, one step of the elimination process is Ri·Gi·x.

When this elimination process is performed on (k−1) directions except θm sequentially, eliminating operations for up to the (k−1)th direction are as shown in Equation 14.

$$\begin{aligned} x_0 &= x(1:k+1) \\ x_1 &= R_1 G_1 x_0 \\ x_2 &= R_2 G_2 x_1 \\ &\vdots \\ x_{k-1} &= R_{k-1} G_{k-1} x_{k-2} \end{aligned} \qquad (14)$$

Calculating them recurrently and making use of the relationship of Ri·Gi·R$_{i-1}$=Ri·Gi yields the received signal vector x as in Equation 15.

$$\begin{aligned} x_{k-1} &= R_{k-1} G_{k-1} R_{k-2} \ldots R_2 G_2 R_1 G_1 x_0 \\ &= R_{k-1} G_{k-1} \ldots G_2 G_1 x_0 \\ &= R_{k-1} \prod_{i=1}^{k-1} G_i \cdot x_0 \end{aligned} \qquad (15)$$

Equation 15 indicates that the product of the matrix Gi is commutative and that the order of elimination in the elimination process does not affect the outcome.

Here, in order to explicitly represent extraction of θm direction, the extracted signal for only the object in the θm direction (m=1, 2, . . . , k) is represented as shown in Equation 16 below.

$$x_{k-1,\theta_m} = R_{k-1} \prod_{i \neq m} G_i \cdot x_0 \qquad (16)$$

That is, the rows other than the first and second rows are set to zero in order to eliminate received signals from directions other than the θm direction. Since the elimination process described above is equivalent to calculating Equation 17 below using Gall (=G1·G2· . . . ·Gk), which is a matrix for eliminating all of k arrival angles including the extracting arrival angle θm, and the inverse matrix Gm$^{-1}$ of matrix Gm for eliminating only θm, calculation could also be done in such a manner.

$$x_{k-1,\theta_m} = R_{k-1} G_m^{-1} G_{all} x_0 \qquad (17)$$

Since Gm is an upper triangular matrix and diagonal terms are non-zero, its inverse matrix generally exists. Here, the aforementioned Gall is represented as Equation 18.

$$G_{all} \equiv \prod_{i=1}^{k} G_i \qquad (18)$$

The resultant two valid elements shown by Equation 19 obtained through this elimination process can be used as a sub-interferometer to perform Doppler DOA signal processing.

$$\begin{aligned} &x_{k-1,\theta m}(1) \\ &x_{k-1,\theta m}(2) \end{aligned} \qquad (19)$$

By further performing similar processing while changing the extracting arrival angle sequentially in response to the number of targets detected by the prefilter unit 105, estimated images of multiple targets can be separately output by the image generation unit 107.

As described above, the configuration of the first embodiment enables separated imaging of even multiple persons in human imaging that is produced from multiple Doppler components.

[Operation]

Next, the operation of the human detection radar system 100 will be described. FIG. 5 is a flowchart illustrating an example of the target detection method implemented by the human detection radar system 100 in the first embodiment.

First, the transmission unit 102 generates a radio wave to be transmitted from the transmit antenna element 101a (S101).

The transmit antenna 101 then radiates the radio wave from each transmit antenna element 101a (S102), and the receive antenna 103 receives reflected waves from targets (S103). More specifically, three receive antenna elements 103a, 103b, 103c which are arranged in a row substantially parallel to the plane of travel of targets and at equal spacings each receive reflected waves.

Next, the reception unit 104 demodulates the multiple reflected waves received by the receive antenna elements 103a, 103b, 103c to generate received signals (the first received signals) corresponding to the receive antenna elements 103a, 103b, 103c (S104).

The prefilter unit 105 then uses the received signals (the first received signals) corresponding to the receive antenna elements 103a, 103b, 103c to estimate multiple main arrival angles, that is, the directions of the targets relative to the human detection radar system 100 (S105).

Next, the direction canceling unit 106 uses the at least three received signals (the first received signals) generated in the reception unit 104 to form nulls in eliminating arrival angles, which are all the main arrival angles except one main arrival angle as the extracting arrival angle among multiple main arrival angles, in the directional characteristics of the receive antenna 103, thereby generating at least two extracted signals (the first extracted signals) (S106). The direction canceling unit 106 sequentially changes the extracting arrival angle in response to the number of main arrival angles detected by the prefilter unit 105.

Next the image generation unit 107 uses the at least two extracted signals generated by the direction canceling unit 106 to analyze Doppler frequency components around the extracting arrival angle and calculates scattering-center arrival angles which are each the arrival angle for each Doppler frequency component analyzed (S107). The image generation unit 107 can thereby estimate the direction of each part of the target present in the direction of the extracting arrival angle. In other words, multiple targets can be detected as separate objects, or specifically, the target present in the direction of the extracting arrival angle can be detected separately from the other targets.

Next, whether the extracted signal generation step (S106) and the scattering-center arrival angle calculation step (S107) are completed for all the main arrival angles detected in the estimation step (S105) is determined (S108). If completed (Yes at S108), the target detection method ends. If not completed (No at S108), the extracted signal generation step (S106) and the scattering-center arrival angle calculation step (S107) are repeated. That is, the extracted signal generation step (S106) and the scattering-center arrival angle calculation step (S107) are repeated with the extracting arrival angle sequentially changed in response to the number of main arrival angles detected in the estimation step (S105).

Through the process, the directions of individual parts of each one of multiple targets can be estimated. Accordingly, each one of the multiple targets can be detected separately from the other targets.

[Effects]

As described above, in the human detection radar system 100 according to the first embodiment, at least three received signals are used to generate at least two extracted signals by forming nulls in eliminating arrival angles, which are all the main arrival angles except one main arrival angle as the extracting arrival angle among multiple main arrival angles $\theta m$ (m=1, 2, . . . , k), in the directional characteristics of the receive antenna 103, and Doppler frequency components around the extracting arrival angle are analyzed using the at least two extracted signals to calculate scattering-center arrival angles.

This enables separation of multiple reflected waves received from multiple targets, or, stated differently, mutual interference of received signals between targets can be suppressed. Therefore, Doppler frequency components of each of reflected waves reflected by the multiple targets can be analyzed and scattering-center arrival angles, which each represent the arrival angle for each Doppler frequency component analyzed, can be calculated. Consequently, even for targets that are composed of multiple parts such as humans, the directions of individual parts of each target can be calculated and hence multiple targets can be detected as separate objects.

Second Embodiment

The second embodiment is similar to the first embodiment in configuration, but differs in the processing performed by the direction canceling unit 106. The following description will mainly focus on the differences.

[Underlying Knowledge Forming Basis of the Present Embodiment]

Before describing the second embodiment, consider a case in which the desired target is positioned in an endmost one of all the directions in which targets are present in the context of the human detection radar system 100 according to the first embodiment.

The direction canceling unit 106 in the first embodiment sets only the directions in which the targets other than the desired target are present as eliminating arrival angles during performance of the elimination process described above.

Figure 6A:
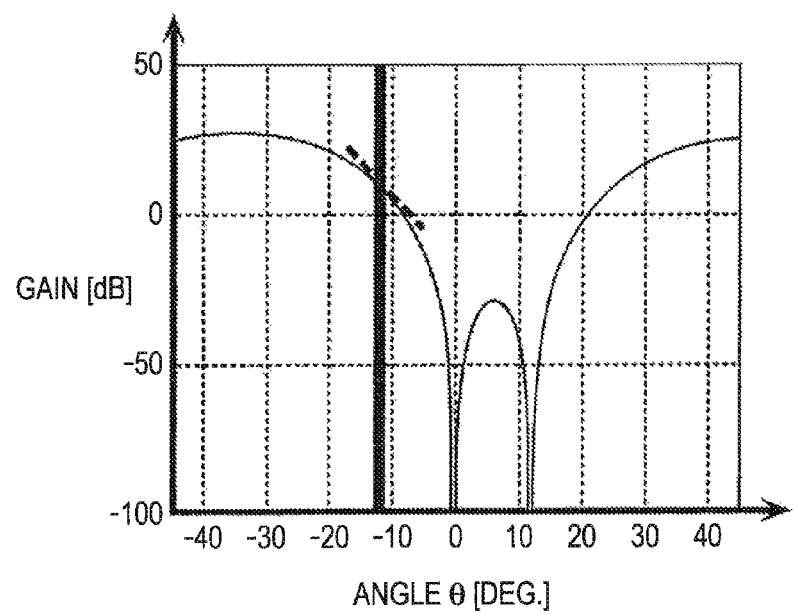
FIG. 6A is a graph showing the directional characteristics of a receive antenna obtained when the extracting arrival angle is smaller than the other eliminating arrival angles.

FIG. 6A is a graph showing the directional characteristics (the horizontal axis represents the arrival angle and the vertical axis represents the gain) of the receive antenna 103 obtained through the elimination process described in the first embodiment when the extracting arrival angle is smaller than the other eliminating arrival angles (is smallest among the main arrival angles). FIG. 6A shows directional characteristics for a case in which targets are present at about −12°, about 0°, and about 12°, with about −12° being the extracting arrival angle and about 0° and about 12° being eliminating arrival angles.

The human detection contemplated by the present disclosure is performed over a range of, for example, about 10 meter square or less as the detection area. Then, a human being, supposed to be one meter square in size, as the target cannot be said to be sufficiently small relative to the distance of the range; it has an expansion of 5° when located 10 meters away. In this example, accordingly, a person located in the extracting arrival angle direction has a difference in gain exceeding 10 dB between the smaller angle side and the larger angle side.

That is to say, due to the presence of the target over a certain angle range at a distance of 10 m from the receive antenna 103 and the directional characteristics of the receive antenna 103, even reflected waves from different parts of the same target can largely vary in gain (for example, 10 dB or higher), which leads to the following problem.

Figure 6B:
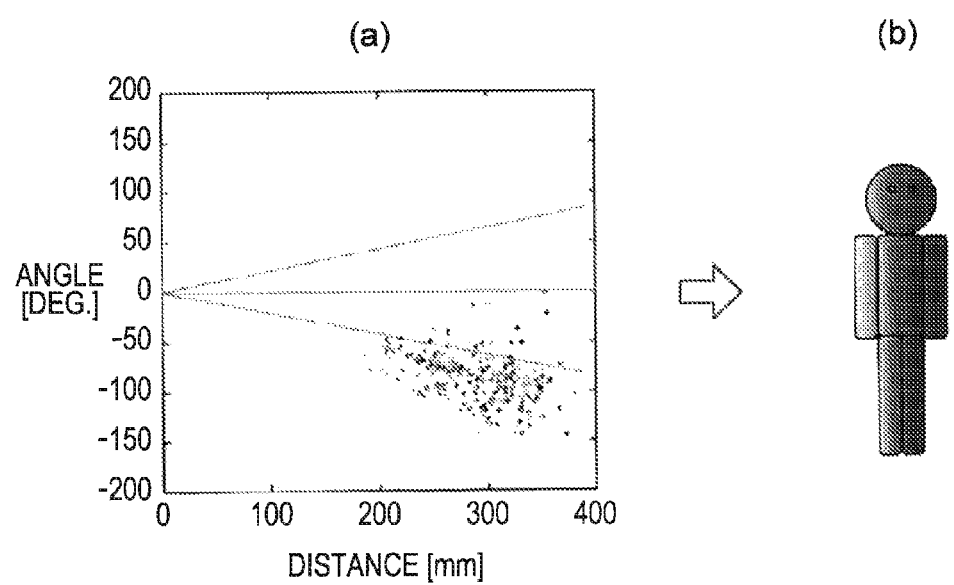
FIG. 6B is a diagram illustrating an imaging result produced by continuously plotting the trail of a person walking.

FIG. 6B is a diagram illustrating the result of imaging produced by continuously plotting the trail of a person walking: part (a) of FIG. 6B shows the result of imaging representing mapping by the image generation unit 107 and part (b) of FIG. 6B shows an estimated image of the target generated from the result of imaging in part (a).

As can be seen from part (a) of FIG. 6B, the result of imaging is significantly distorted relative to the actual trail owing to the effects of the gain imbalance in the directional characteristics of the receive antenna 103 for the direction in which the target is present. In other words, the result of imaging is biased away from the real position toward the angle on the higher gain side of the directional characteristics.

Such bias of the imaging result manifests itself as a situation in which only a half side of the person is visible in its frontal view as shown in part (b) of FIG. 6B even though human imaging is implemented. This means that it is not possible to decide whether an estimated image generated from the imaging result represents a human being or not.

We thus have found out that it is desirable that the directional characteristics of the receive antenna 103 have a small gain imbalance for the angle (for example, 5°) that is covered by the target present in the extracted direction of arrival. The elimination process implemented in the direction canceling unit in the second embodiment described below is based on this finding.

[Elimination Process in the Direction Canceling Unit]

The processing performed by the direction canceling unit in the second embodiment will be described below in detail.

Figure 7A:
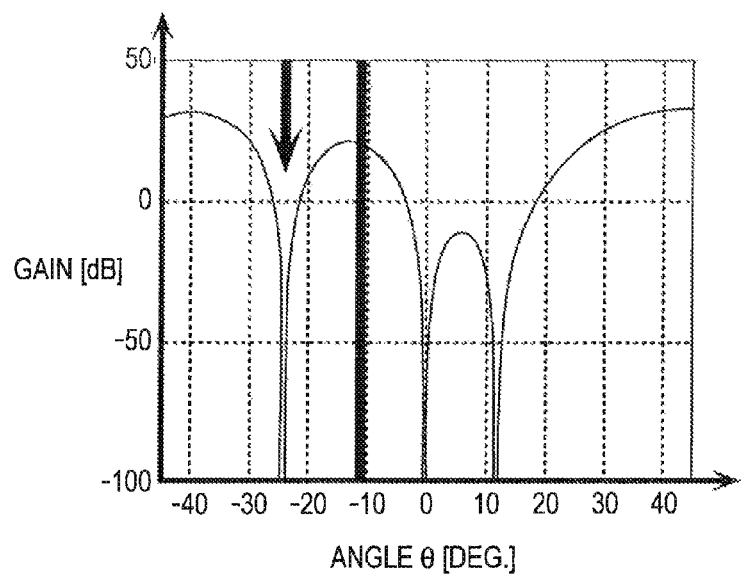
FIG. 7A is a graph showing the directional characteristics in a second embodiment.

FIG. 7A is a graph showing the directional characteristics in the second embodiment. Specifically, it shows the directional characteristics of the receive antenna 103 obtained through the elimination process performed by the direction canceling unit in the second embodiment. FIG. 7A shows directional characteristics for a case in which targets are present at about −12°, about 0°, and about 12°, with about −12° being the extracting arrival angle and about 0° and about 12° being eliminating arrival angles, as with FIG. 6A.

Comparison of 7A with FIG. 6A shows that a null is additionally formed at about −24° in FIG. 7A. That is, when compared to the direction canceling unit 106 in the first embodiment, the direction canceling unit in the second embodiment forms an additional null when the extracting arrival angle is the minimum or maximum of multiple main arrival angles such that the extracting arrival angle substantially coincides with the midpoint between the direction of the additional null to be newly generated and the eliminating arrival angle that neighbors the extracting arrival angle.

This reduces the gain imbalance around the extracting arrival angle in the directional characteristics of the receive antenna 103. A "direction substantially coinciding with the midpoint" may deviate from the midpoint direction to some extent: for example, the difference from the midpoint direction may be 10° or smaller, preferably 5° or smaller, and more preferably 1° or smaller.

Figure 7B:
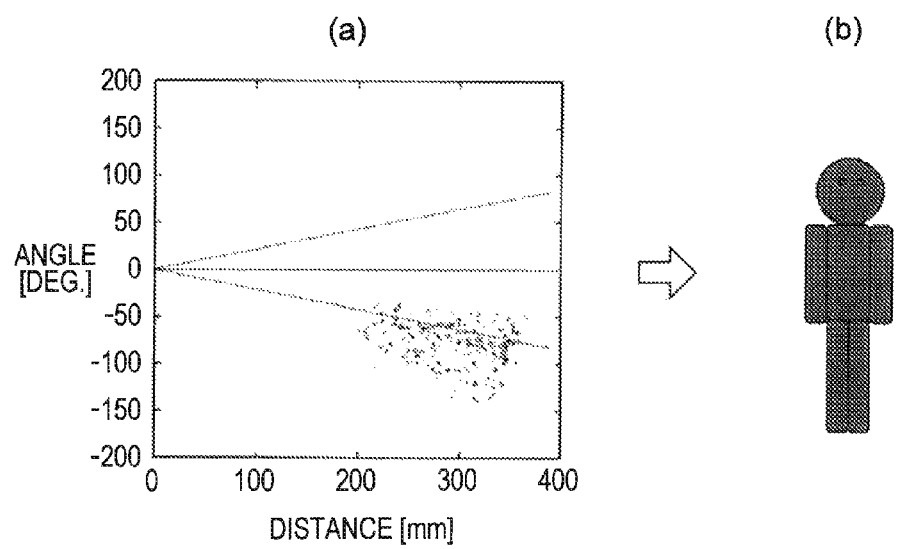
FIG. 7B is a diagram illustrating an imaging result produced by continuously plotting the trail of a person walking.

As a result, the human detection radar system in this embodiment produces the imaging result shown in FIG. 7B.

FIG. 7B is a diagram illustrating an imaging result produced by continuously plotting the trail of a person walking: part (a) of FIG. 7B shows the result of imaging representing mapping by the image generation unit 107 and part (b) of FIG. 7B shows an estimated image of the target generated from the imaging result in part (a).

It can be seen that the result of imaging is less distorted relative to the real trail as shown in part (a) of FIG. 7B owing to the reduction of gain imbalance in the directional characteristics of the receive antenna 103 for the direction in which the target is present. That is, distortion of the imaging result is reduced, allowing an estimated image generated from the imaging result to be identified as a human being.

The human detection radar system in this embodiment can thus produce an imaging result with small distortion.

The principle of the elimination process performed by the direction canceling unit in this embodiment will be described below.

The number n of receive antenna elements used for detecting k targets simultaneously is (k+1), as is apparent also from the first embodiment. The second embodiment uses at least (n+1) receive antenna elements so that a maximum of (k+2) targets can be detected at a time, and the direction canceling unit in this embodiment carries out the elimination process as follows.

Specifically, a virtual target is imagined as the (k+2)th target and the elimination process is performed on the (k+2)th target. That is, a null is formed in the directional characteristics of the receive antenna 103 in the direction of the virtual target as the (k+2)th target. Such a null formed in the direction of a virtual target is referred to as a virtual null herein.

As described above, the elimination process performed by the direction canceling unit in the second embodiment differs from the one performed by the direction canceling unit 106 in the first embodiment in that it is additionally executed on a virtual target, that is, a virtual null is set.

The number of receive antenna elements to be increased for formation of a virtual null is preferably limited to one or two.

When the direction of a virtual null is referred to as a virtual arrival angle and represented as ν, the direction canceling unit in the second embodiment preferably sets ν in accordance with (1) to (3) below. FIGS. 8A through 10C are diagrams illustrating setting of a virtual arrival angle.

Figure 8A:
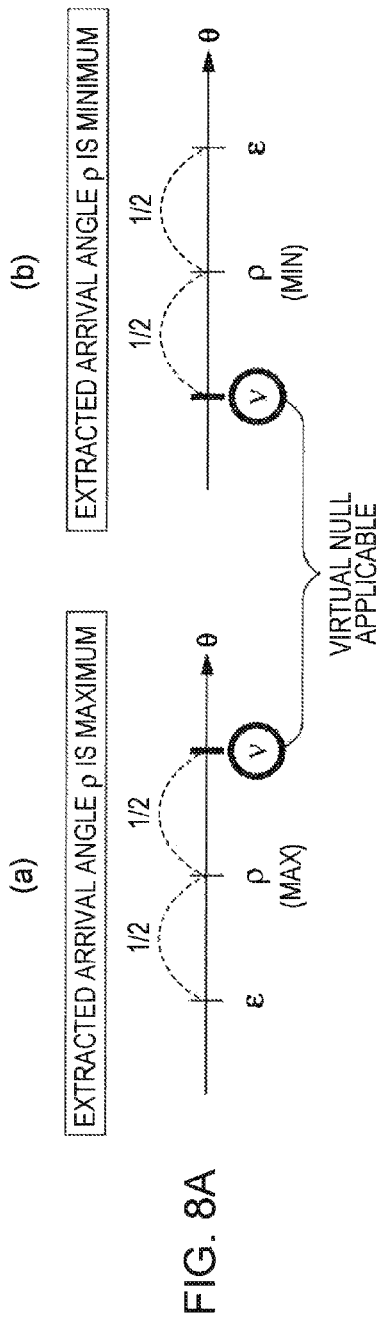
FIG. 8A is a diagram illustrating setting of a virtual arrival angle.

(1) As shown in FIG. 8A, when the extracting arrival angle ρ is the minimum or maximum of multiple main arrival angles, virtual arrival angle ν is set in the direction that satisfies ρ=(ν+ε)/2, where ε is the eliminating arrival angle that neighbors the extracting arrival angle ρ. Part (a) of FIG. 8A is a diagram illustrating a case in which the extracting arrival angle ρ is the maximum, while part (b) of FIG. 8A is a diagram illustrating a case in which the extracting arrival angle ρ is the minimum.

Setting a virtual arrival angle in the above-described manner can position the extracting arrival angle in the midpoint direction between the eliminating arrival angle that is closest to the extracting arrival angle and the virtual arrival angle, so imbalance in the gain can be reduced.

Figure 8B:
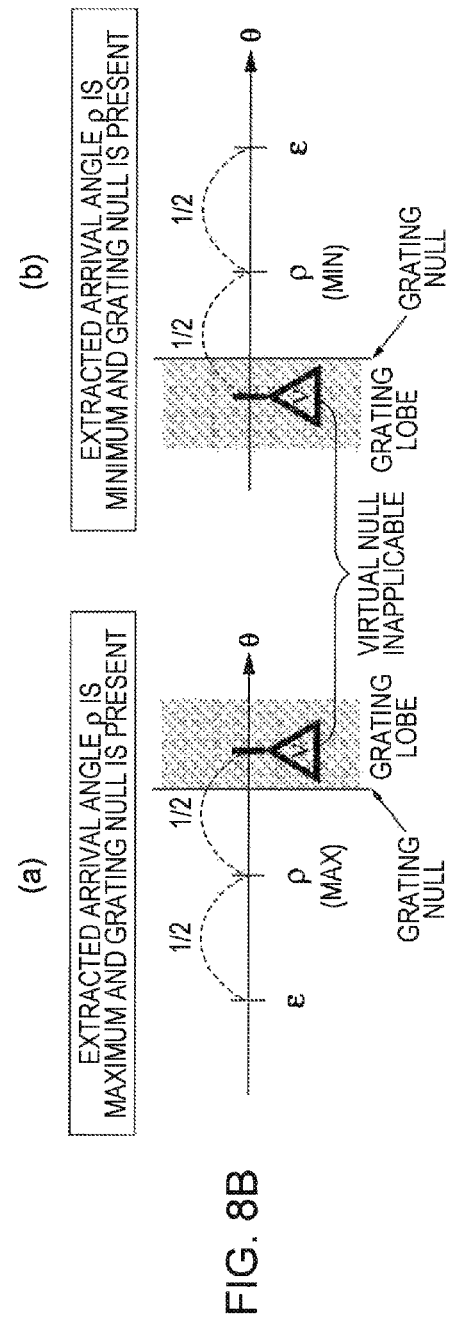
FIG. 8B is a diagram illustrating setting of a virtual arrival angle.

(2) When a grating lobe is present and the direction of its null is ±γ (γ>0) as shown in FIG. 8B, if ν determined in (1) satisfies ν<−γ or ν>γ, then no virtual arrival angle is set. Part (a) of FIG. 8B is a diagram illustrating a case in which the extracting arrival angle ρ is the maximum and ν>γ, while part (b) of FIG. 8B is a diagram illustrating a case in which the extracting arrival angle ρ is the minimum and ν<−γ.

When a grating null is present, setting of a virtual arrival angle is less meaningful because the grating null itself reduces the gain, and omission of a virtual arrival angle has the advantage of reducing the number of matrix products by one.

(3) Even when the extracting arrival angle ρ is not the minimum or the maximum, if two eliminating arrival angles ε1 and a (ε1<ρ<ε2) that neighbor the extracting arrival angle ρ are present and the extracting arrival angle ρ is biased toward either one of them, a virtual arrival angle ν is set as follows. Suppose here that the arrival angles are in the relationship: ρ=(1−u)·ε1+u·ε2 (0<u<1). Also, a parameter δ (½≤δ<1) is predefined.

Figure 9A:
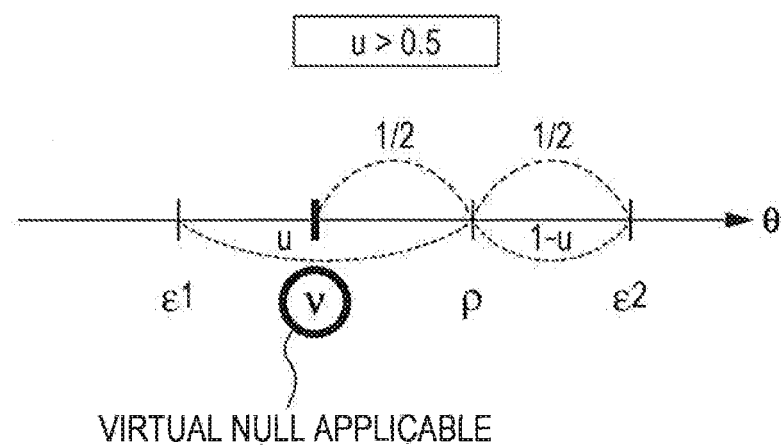
FIG. 9A is a diagram illustrating setting of a virtual arrival angle.

(3-1) When u>½ as shown in FIG. 9A, the virtual arrival angle ν is set so that ρ=(ν+ε2)/2 is satisfied.

Figure 9B:
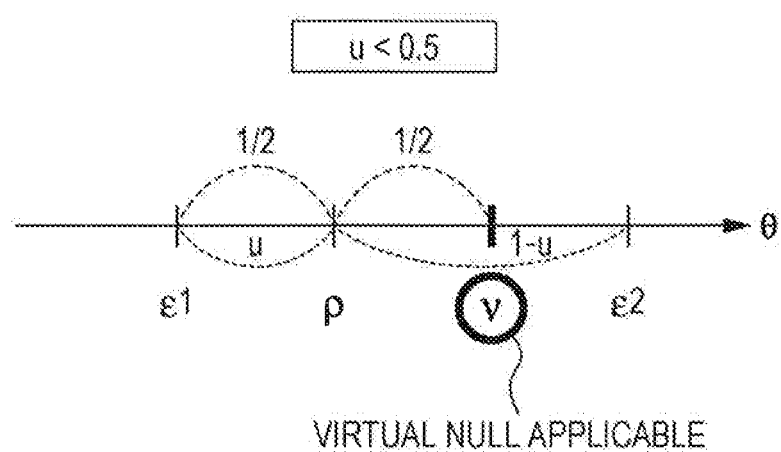
FIG. 9B is a diagram illustrating setting of a virtual arrival angle.

(3-2) When u<½ as shown in FIG. 9B, the virtual arrival angle ν is set so that ρ=(ν+ε1)/2 is satisfied.

Figure 10A:
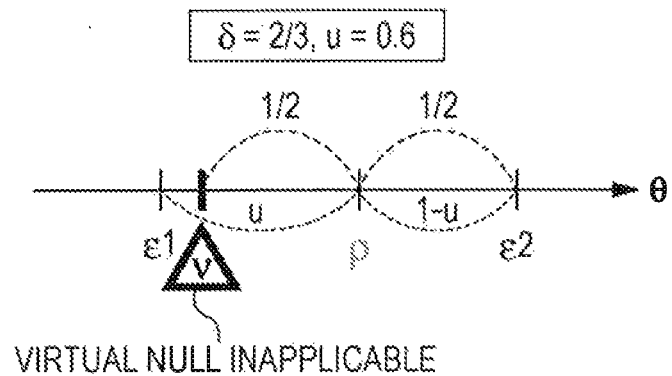
FIG. 10A is a diagram illustrating setting of a virtual arrival angle.
Figure 10B:
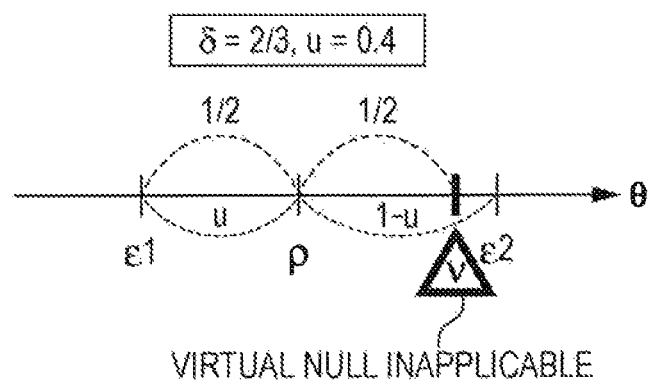
FIG. 10B is a diagram illustrating setting of a virtual arrival angle.
Figure 10C:
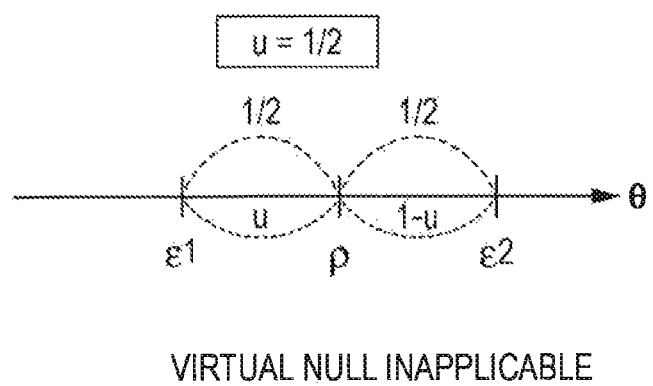
FIG. 10C is a diagram illustrating setting of a virtual arrival angle.

(3-3) However, when either of the relationship u=½ or 1−δ<u<δ is satisfied as shown in FIGS. 10A to 10C, no virtual arrival angle is set.

By these rules, the extracting arrival angle ρ can be positioned in the midpoint direction between the eliminating arrival angle closest to ρ (ε1 or ε2) and the virtual arrival angle ν as per (3-1) and (3-2). Further, by intentionally omitting the insertion of the virtual arrival angle as per (3-3) when the gain imbalance is small, the number of matrix products can be decreased by one.

The value of δ may be predetermined as, for example, δ=⅔ based on simulations or the results of measurements. If the virtual arrival angle is not to be omitted (except for u=½), δ may be set to δ=½.

This way of calculation yields a human imaging result with small distortion as illustrated in part (b) of FIG. 7B.

As described above, the configuration of the second embodiment can yield an imaging result with small distortion in human imaging produced using many Doppler components, so the result may be utilized to obtain information required in human recognition or identification without distortion. As a result, erroneous identifications of targets and the like can be reduced.

In summary, as compared to the direction canceling unit 106 in the first embodiment, the direction canceling unit in the second embodiment further forms a null in a direction that substantially coincides with midpoint between the extracting arrival angle and the eliminating arrival angle that neighbors the extracting arrival angle when the extracting arrival angle is the minimum or maximum of multiple main arrival angles.

The human detection radar system according to the second embodiment can thereby reduce the gain imbalance around the extracting arrival angle in the directional characteristics of the receive antenna 103, so it can produce an imaging result with small distortion when compared with the human detection radar system 100 in the first embodiment.

Third Embodiment

The human detection radar system according to a third embodiment differs from the human detection radar system 100 in the first embodiment in that it uses two transmit antenna elements. The first embodiment is capable of only direction estimation in one dimension, that is, two-dimensional imaging in a horizontal plane. The third embodiment, in contrast, enables two-dimensional direction estimation, or three-dimensional imaging.

Figure 11:
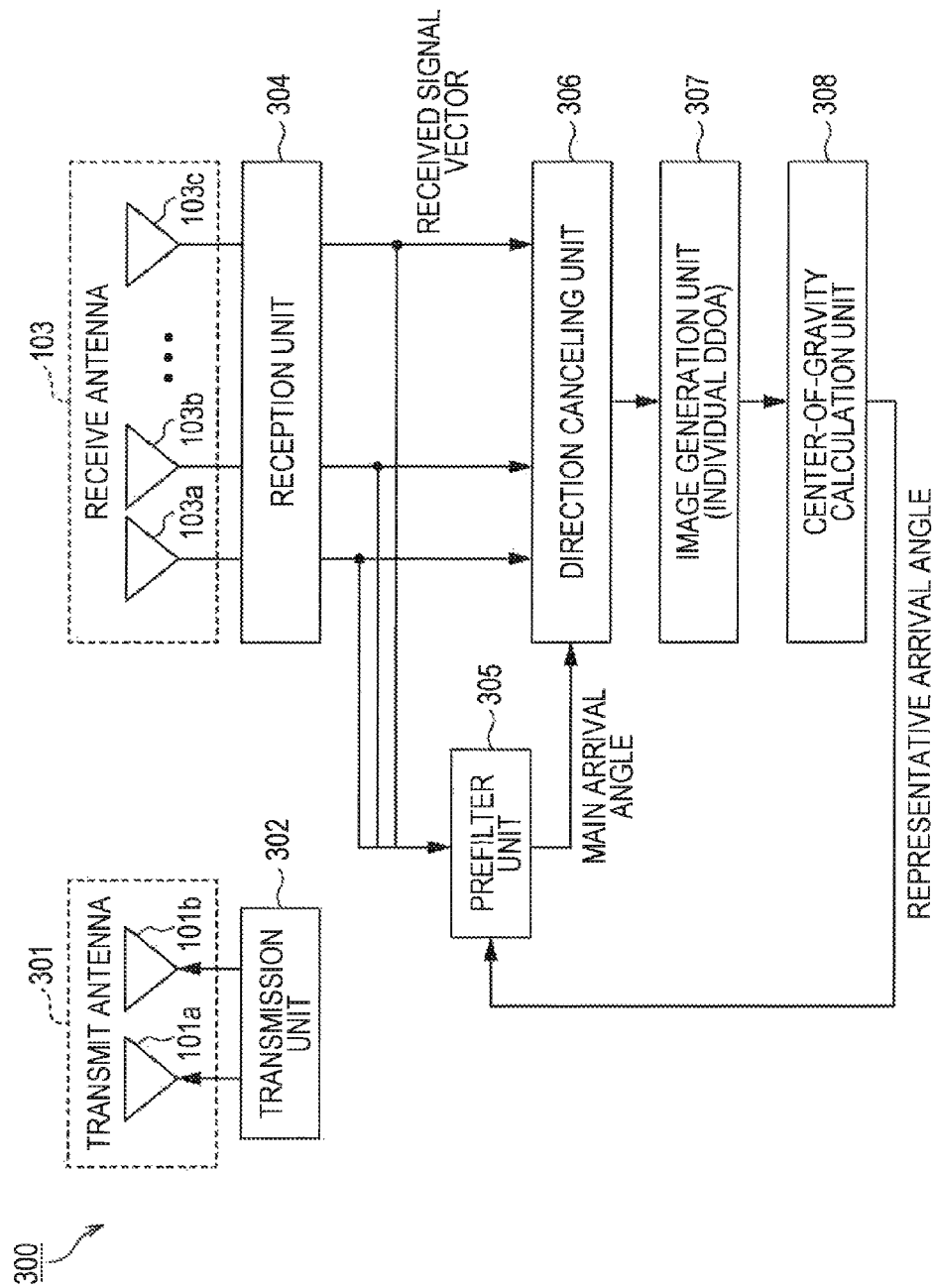
FIG. 11 is a block diagram showing the configuration of the human detection radar system according to a third embodiment.
Figure 12:
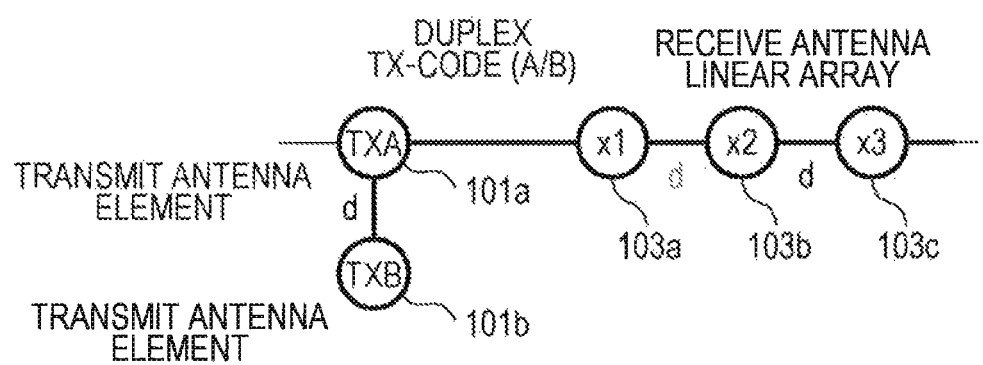
FIG. 12 is a diagram illustrating the physical arrangement of a transmit antenna and a receive antenna linear array in the third embodiment.

FIG. 11 is a block diagram showing the configuration of a human detection radar system 300 in the third embodiment, and FIG. 12 is a diagram illustrating the physical arrangement of the transmit antenna and the receive antenna linear array in the third embodiment.

The human detection radar system 300 shown in FIG. 11 includes a transmit antenna 301, a receive antenna 103 that is composed of at least three elements and is installed substantially parallel to the plane of travel of targets, a transmission unit 302 that generates a radio wave to be transmitted from the transmit antenna 301, a reception unit 304 that demodulates radio waves reflected off targets (human beings) and generates received signals, a prefilter unit 305 that estimates the directions of arrival (main arrival angles) of multiple reflected waves, a direction canceling unit 306 that uses input signals from the receive antenna 103 to generate nulls sequentially in all the main arrival angles (eliminating arrival angles) except one main arrival angle (the extracting arrival angle) θ among the main arrival angles estimated by the prefilter unit 305 and generate a sub-interferometer, an image generation unit 307 that analyzes Doppler frequency components around the arrival angle θ using the sub-interferometer generated in the direction canceling unit 306 and calculates an arrival angle (scattering-center arrival angle) and a distance for each Doppler frequency based on the sub-interferometer, and a center-of-gravity calculation unit 308. The center-of-gravity calculation unit 308 is optional. The transmission unit 302, the reception unit 304, the prefilter unit 305, the direction canceling unit 306 and the image generation unit 307 correspond to the transmitter, the receiver, the prefilter, the direction canceler and the image generator of the present disclosure, respectively.

The individual components will be described below.

The transmit antenna 301 further includes a transmit antenna element 101b, compared to the transmit antenna 101 in the first embodiment.

As the transmit antenna element 101a and the receive antenna 103 are the same as the first embodiment, they are denoted with the same reference characters. The transmit antenna element 101b forms a pair with the transmit antenna element 101a, and they are arranged so as to be orthogonal to the receive antenna linear array formed of the receive antenna elements 103a, 103b, 103c, and also installed substantially vertically to the plane of travel of targets (a horizontal plane). That is, a plane that includes all of the transmit antenna elements 101a, 101b and the receive antenna elements 103a, 103b, 103c is substantially vertical to the plane of travel of targets (a horizontal plane).

The radio wave to be transmitted from the transmit antenna element 101a is modulated with pseudo-noise code TXA, while the radio wave to be transmitted from the transmit antenna element 101b is modulated with pseudo-noise code TXB. The pseudo-noise codes TXA and TXB are chosen so that they are orthogonal to each other and have no correlation to each other. For example, M-sequence codes generated from completely separate generating polynomials may be used. Alternatively, a single code TX0 that is sufficiently long relative to the maximum amount of delay Dmax corresponding to the maximum detection distance may be used and TX0(0) may be assigned to TXA and TX0(s) to TXB. Here, TX0(a) is supposed to represent a code that is cyclically shifted so as to start at the a-th bit of the original code TX0. Although TX0(s) has an offset of s bits relative to TX0(0), setting of s>>Dmax prevents TX0(0) and TX0(s) from outputting peaks in correlation to each other within the distance range to be observed (the maximum detection range determined by the delay Dmax).

This permits the radio wave transmitted from the transmit antenna element 101a and the radio wave transmitted from the transmit antenna element 101b to be demodulated exclusively from each other, which is accordingly called code multiplexing. That is, reflected waves received by the receive antenna 103 may be demodulated with the same code as TXA in the reception unit 304 to extract only reflected waves of the radio wave transmitted from the transmit antenna element 101a and demodulated with the same code as TXB to extract only reflected waves of the radio wave transmitted from the transmit antenna element 101b.

The transmission unit 302 generates a first radio wave which is the radio wave to be transmitted from the transmit antenna element 101a (the first transmit antenna element) by modulating a carrier wave with TXA (the first pseudo-noise code) and generates a second radio wave which is the radio wave to be transmitted from the transmit antenna element 101b (the second transmit antenna element) by modulating the carrier wave with TXB (the second pseudo-noise code) orthogonal to TXA (the first pseudo-noise code).

The reception unit 304 generates at least three received signals (the first received signals) by demodulating each of multiple reflected waves with TXA (the first pseudo-noise code). It also generates at least three received signals (the second received signals) by demodulating each of the multiple reflected waves with TXB (the second pseudo-noise code).

The prefilter unit 305 estimates multiple main arrival angles representing the directions of multiple targets relative to the human detection radar system 300 using the at least three received signals demodulated with TXA (the first received signals). That is, as with the prefilter unit 105 in the first embodiment, the prefilter unit 305 estimates multiple main arrival angles in directions parallel to the plane of travel of targets. It also estimates multiple main arrival angles representing the directions of the targets relative to the human detection radar system 300 using the at least three received signals demodulated with TXB (the second received signals). That is, it estimates multiple main arrival angles in directions substantially vertical to the plane of travel of targets.

The direction canceling unit 306 generates at least two extracted signals (the first extracted signals) using the at least three received signals (the first received signals) demodulated with TXA (the first pseudo-noise code). It also generates at least two extracted signals (the second extracted signals) using the at least three received signals (the second received signals) demodulated with TXB (the second pseudo-noise code).

The image generation unit 307 calculates scattering-center arrival angles in directions substantially parallel to the plane of travel of targets using at least two extracted signals that are based on TXA (the first extracted signals). It also calculates scattering-center arrival angles in directions substantially vertical to the plane of travel of targets using one of at least two extracted signals that are based on TXA (the first extracted signals) and one of at least two extracted signals that are based on TXB (the second extracted signals).

That is, the image generation unit 307 carries out calculation of scattering-center arrival angles in the directions horizontal and vertical to the plane of travel of targets, that is, two-dimensional estimation of directions. Thus, three-dimensional imaging in the horizontal and vertical planes becomes possible.

The center-of-gravity calculation unit 308 further calculates a representative direction of arrival in a direction substantially vertical to the plane of travel of targets in comparison to the center-of-gravity calculation unit 108 in the first embodiment.

Figure 13A:
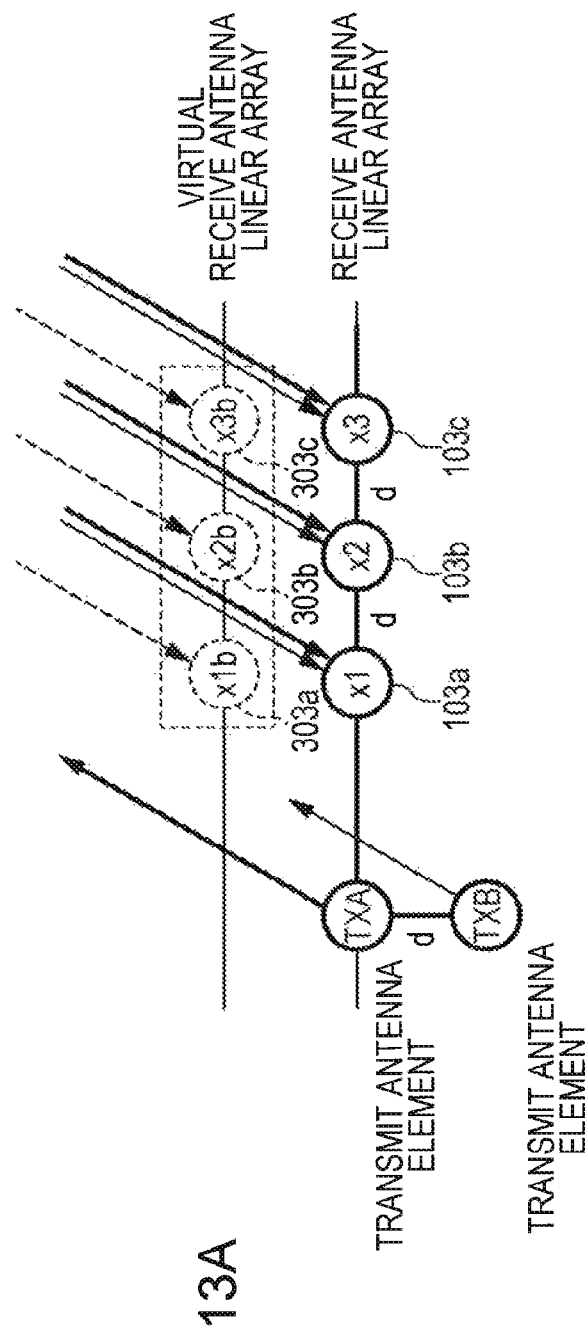
FIG. 13A is a diagram illustrating the target direction detection performed by the human detection radar system in the third embodiment.
Figure 13B:
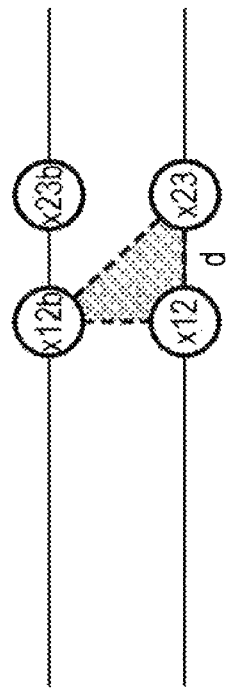
FIG. 13B is a diagram illustrating the target direction detection performed by the human detection radar system in the third embodiment.

Next, detection of the target direction performed by the human detection radar system 300 according to the third embodiment configured as described above will be described specifically. FIGS. 13A and 13B are diagrams illustrating the target direction detection performed by the human detection radar system 300 in the third embodiment.

FIG. 13A schematically illustrates formation of a virtual receive antenna linear array with the configuration in FIG. 12. The antenna spacing d (about 2.5 mm to 5 mm for 60-GHz carrier wave) is sufficiently small relative to the distance to the target (about 1 m to 10 m), and reflected waves can be considered as plane waves (parallel incidence).

Here, supposing propagation paths that originate simultaneously from the transmit antenna element 101a and the transmit antenna element 101b and reach the receive antenna linear array after reflection on the same target, this is equivalent to receiving radio waves (different only in spreading code) transmitted from a portion of the transmit antenna 101 at the receive antenna linear array and a virtual receive antenna linear array.

In other words, when a radio wave transmitted from the transmit antenna element 101b is regarded as a radio wave transmitted from the transmit antenna element 101a, the radio wave transmitted from the transmit antenna element 101b can be assumed to be received by a virtual linear array placed at a certain position relative to the receive antenna linear array. This virtual linear array is formed from virtual receive antenna elements 303a, 303b, 303c corresponding to the real receive antenna elements 103a, 103b, 103c. Also, the positional relationships between the receive antenna elements 303a, 303b, 303c and the corresponding receive antenna elements 103a, 103b, 103c equate with the positional relationship between the transmit antenna element 101a and the transmit antenna element 101b.

In this example, therefore, the array constituted by receive antenna elements can be regarded as a two-dimensional array composed of three elements by two rows, or six elements. That is, it can be regarded as a two-dimensional array composed of the real receive antenna elements 103a, 103b, 103c and the virtual receive antenna elements 303a, 303b, 303c.

FIG. 13B illustrates a case in which the elimination process described in the first embodiment is carried out on each row. This can form a sub-interferometer composed of two elements for the horizontal direction and similarly form a sub-interferometer composed of two elements for the vertical direction. Using the horizontal and vertical sub-interferometers, two-dimensional estimation of the direction of arrival, namely three-dimensional Doppler imaging can be implemented.

That is, as in the first embodiment, the direction canceling unit 306 uses at least three received signals x1, x2, x3 demodulated with TXA to generate at least two extracted signals x12, x23. It also uses at least three received signals x1 b, x2b, x3b demodulated with TXB to generate at least two extracted signals x12b, x23b.

The image generation unit 307 uses at least two extracted signals x12, x23 that are based on TXA to calculate scattering-center arrival angles in directions parallel to the plane of travel of targets as in the first embodiment. It also calculates scattering-center arrival angles in directions substantially vertical to the plane of travel of targets using one of the at least two extracted signals x12, x23 that are based on TXA and one of the at least two extracted signals x12b, x23b that are based on TXB. That is, the image generation unit 307 performs direction estimation for the horizontal and vertical directions, namely two-dimensional direction estimation. This enables three-dimensional imaging in the horizontal and vertical planes.

Instead of using at least two extracted signals x12, x23 based on TXA, the image generation unit 307 may also use at least two extracted signals x12b, x23b that are based on TXB to calculate scattering-center arrival angles in directions parallel to the plane of travel of targets. In other words, it may perform two-dimensional direction estimation using three sub-interferometers including one of the two sub-interferometers that are based on the real receive antenna linear array and one of the two sub-interferometers that are based on the virtual receive antenna linear array.

As described above, the configuration of the third embodiment enables three-dimensional imaging with separation of individual targets when multiple persons are present in human imaging produced using many Doppler components, so information required for human recognition or identification that utilizes imaging results can be obtained with higher resolution.

Specifically, the human detection radar system 300 in the third embodiment includes a transmit antenna element 101b (the second transmit antenna element) which is disposed substantially vertically to the plane of travel of targets relative to the direction in which a transmit antenna element 101a (the first transmit antenna element) is disposed, and the pseudo-noise code (the first pseudo-noise code) for the radio wave transmitted from the transmit antenna element 101a is orthogonal to the pseudo-noise code (the second pseudo-noise code) for the radio wave transmitted from the transmit antenna element 101b.

This enables two-dimensional direction estimation and hence achieves three-dimensional imaging.

The directions of arrangement of the transmit antenna element 101a and the transmit antenna element 101b are not necessarily required to be substantially vertical to the plane of travel of targets but have only to intersect with it.

Other Embodiments

While the radar system and target detection method according to one or more aspects of the present disclosure have been described with reference to the embodiments thereof, the present disclosure is not limited to the embodiments. Various modifications conceivable to those skilled in the art to the embodiments and embodiments made by combining components from different embodiments may also be encompassed in the range of one or more aspects without departing from the spirit of the present disclosure.

For example, although the number of receive antenna elements was described as three in some of the description of the first and third embodiments above, this is not limitative and the number of receive antenna elements may be at least three. That is, what is required is that the direction canceling unit generates at least two extracted signals using at least three received signals, or stated differently, that a sub-interferometer composed of at least two elements can be generated through the elimination process in the direction canceling unit.

The direction canceling unit accordingly may also generate at least two extracted signals by canceling signals that are based on reflected waves that arrived at the receive antenna from eliminating arrival angles. The signals may be canceled by using at least two sets of two out of at least three received signals in different combinations to sequentially generate nulls in the eliminating arrival angles in the directional characteristics of the receive antenna for each of the at least two sets.

Although the transmission unit modulates a carrier wave using pseudo-noise codes and the reception unit demodulates reflected waves using the pseudo-noise codes in the description above, the modulation signals used for modulation and demodulation are not limited to pseudo-noise codes but may be any kind of signals.

Although the image generation unit was described above as calculating the arrival angle and the distance for each part of a target and mapping the arrival angles and distances calculated to carry out imaging of the target, the image generation unit may omit calculation of the distance. In other words, a target may be imaged using only the arrival angles of the individual parts of the target. The image generation unit may also calculate the arrival angle of each part of the target without performing mapping and mapping may be implemented in a processing unit external to the human detection radar system.

Although the radar system according to one or more aspects was described above in the context of a human detection radar system that detects human beings as targets, the targets to be detected by the radar system according to one or more aspects are not limited humans but may be any object that has multiple parts, more specifically, multiple parts that move differently from each other. In other words, the target may be any object that has multiple parts having different Doppler frequencies, for example, living organisms such as animals, or objects such as bicycles and baby strollers.

EXAMPLES

Examples of the radar system according to the present disclosure will be described using FIGS. 14A through 16.

In the examples, person A and person B as targets are both present at positions two meters away from the receive antenna of the radar system, the main arrival angle of person A being −15° and the main arrival angle of person B being +15°. While person A and person B were continuing the motion of moving their arms and legs staying at their respective positions, person A and person B were detected using signals received over 1.5 seconds among the signals received by the radar system.

Example 1

Figure 14A:
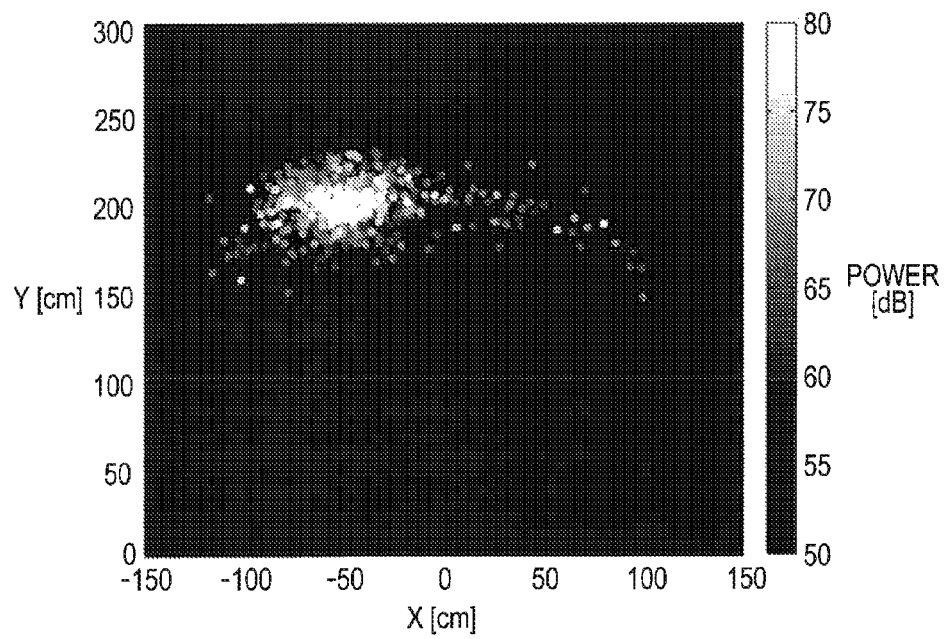
FIG. 14A is a top view showing the result of detection of targets in Example 1 with the extracting arrival angle being set in person A.
Figure 14B:
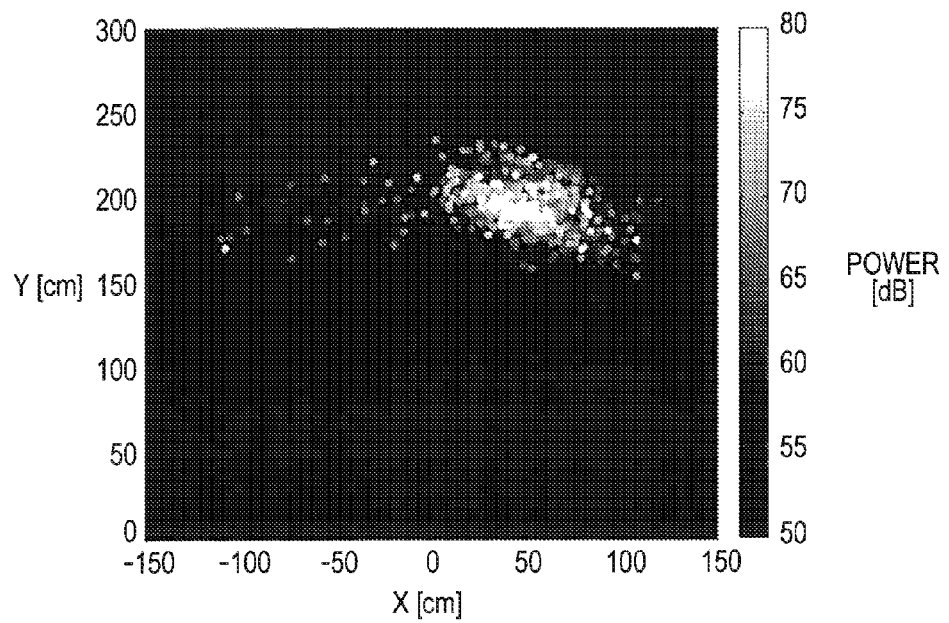
FIG. 14B is a top view showing the result of detection of targets in Example 1 with the extracting arrival angle being set in person B.

In Example 1, the targets were detected using the human detection radar system 100 according to the first embodiment as the radar system. FIGS. 14A through 14C are top views showing the results of detection of the targets in Example 1. FIG. 14A shows the result of detection with the extracting arrival angle being set in person A, while FIG. 14B shows the result of detection with the extracting arrival angle being set in person B. FIG. 14C is a diagram combining the results of detection of persons A and B shown in FIGS. 14A and 14B. In FIGS. 14A through 14C, the receive antenna is located at the position where X is 0 cm and Y is 0 cm.

As can be seen from FIGS. 14A, 14B, and 14C, person A and person B were separated from each other in the detection with the human detection radar system 100 according to the first embodiment.

Figure 17:
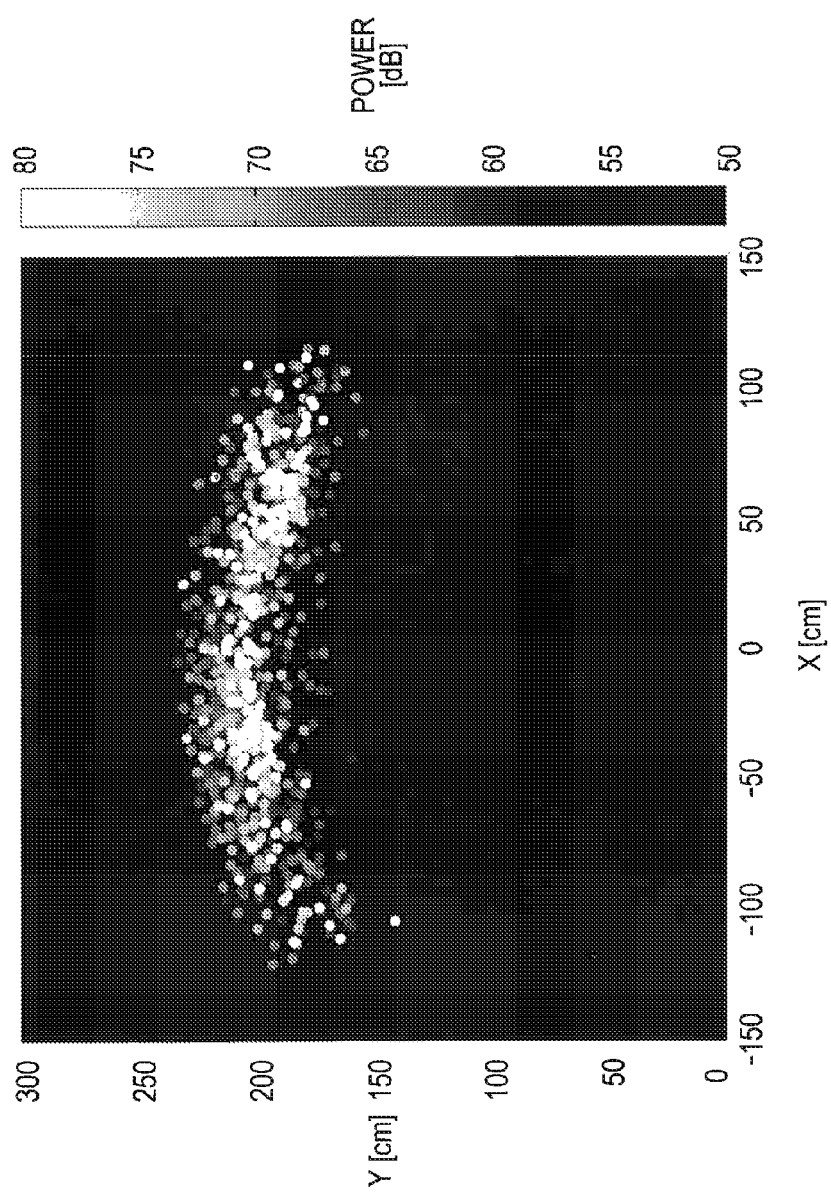
FIG. 17 is a top view showing the result of detection of targets in a comparative example.
Figure 18:
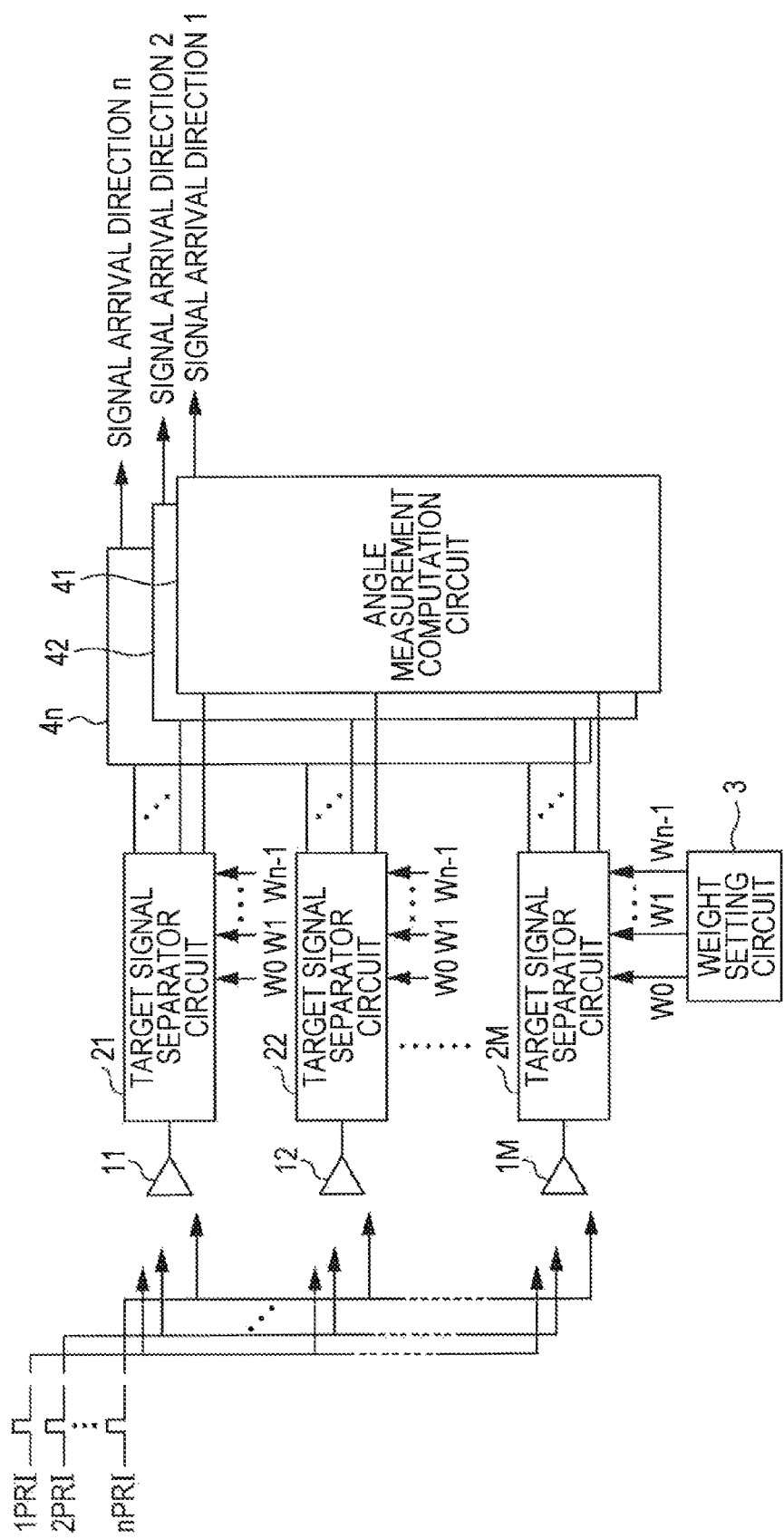
FIG. 18 is a block diagram showing the configuration of a super-resolution antenna disclosed by Japanese Unexamined Patent Application Publication No. 2003-194919.

As a comparative example, person A and person B were detected using a conventional radar system. FIG. 17 is a top view showing the result of detection of the targets in the comparative example.

It is seen from FIG. 17 that person A and person B were not separated from each other in the detection using the conventional radar system as the comparative example.

Example 2

Figure 15:
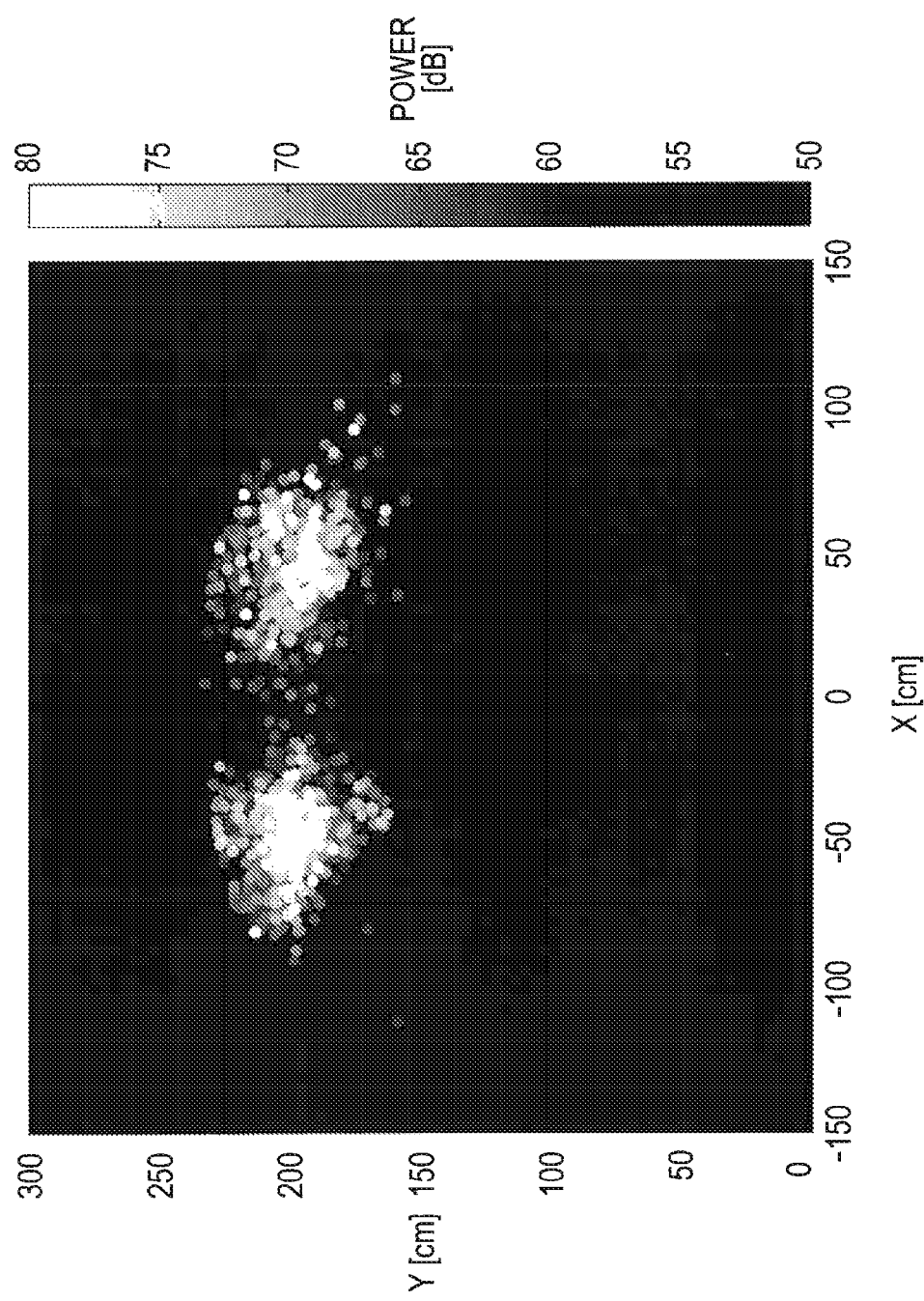
FIG. 15 is a top view showing the result of detection of targets in Example 2.

In Example 2, the targets were detected using the human detection radar system according to the second embodiment as the radar system. FIG. 15 is a top view showing the result of detection of the targets in Example 2. In FIG. 15, the receive antenna is located at the position where X is 0 cm and Y is 0 cm.

As can be seen from FIG. 15, person A and person B were separated from each other in the detection with the human detection radar system according to the second embodiment. In addition, when compared with Example 1, an imaging result with small distortion was yielded.

Example 3

Figure 16:
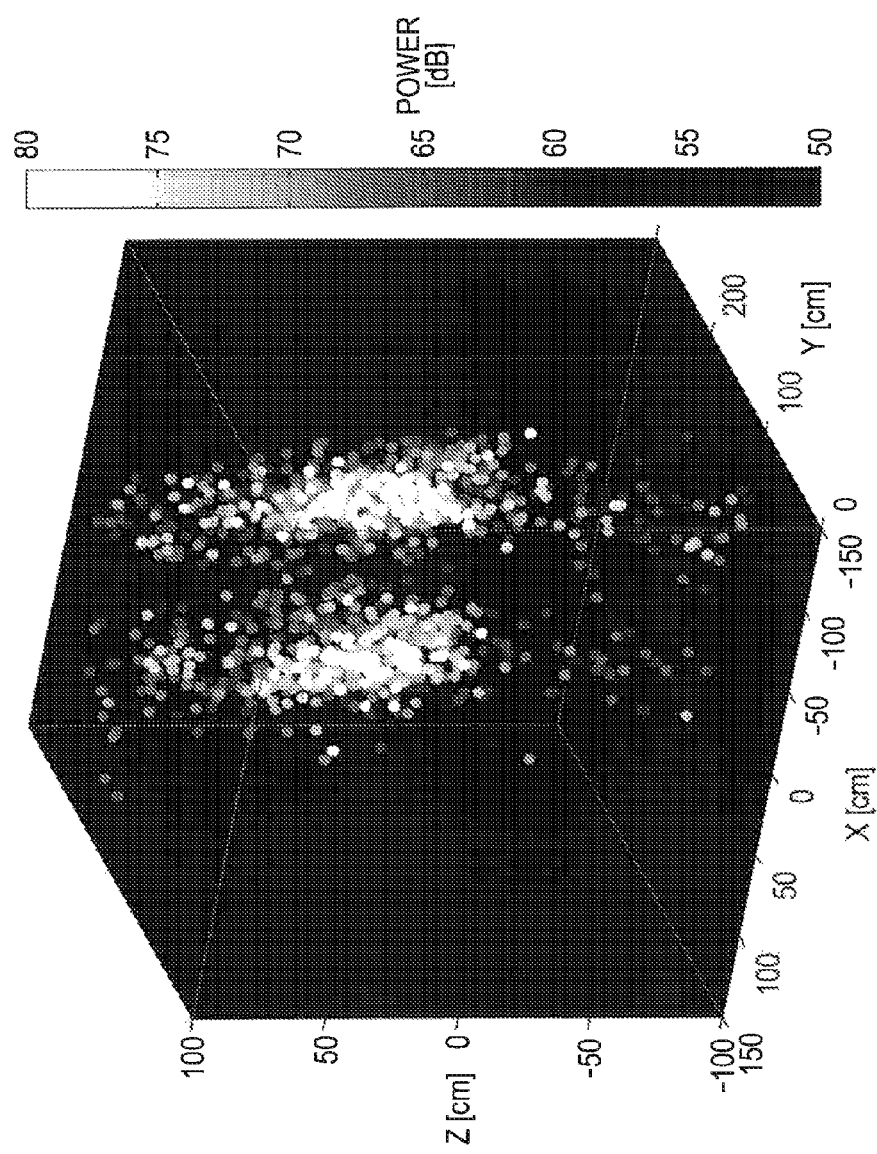
FIG. 16 is a perspective view showing the result of detection of targets in Example 3.

In Example 3, the targets were detected using the human detection radar system 300 according to the third embodiment as the radar system. FIG. 16 is a perspective view showing the result of detection of the targets in Example 3.

As can be seen from FIG. 16, in the detection using the human detection radar system 300 in the third embodiment, person A and person B were separated from each other and also detected as three-dimensional images.

The radar system according to the present disclosure is applicable to a sensing system that can measure or estimate the shape or movement of targets, for example, human beings, by making use of the movements of the targets themselves and track the targets using the result of measurement or estimation, and is useful especially as a sensor or the like for a security system, a nursing or monitoring system, or a collision avoidance system.

What is claimed is:

1. A radar system for detecting a plurality of targets, comprising:
    a transmit antenna that includes at least one transmit antenna element and transmits a radio wave from each transmit antenna element;
    a receive antenna composed of at least three receive antenna elements for receiving a plurality of reflected waves resulting from the radio wave being reflected off the plurality of targets, the at least three receive antenna elements being arranged in a direction substantially parallel to a plane of travel of the targets;
    a transmitter that generates the radio wave to be transmitted from the transmit antenna element;
    a receiver that generates at least three first received signals corresponding to the at least three receive antenna elements by demodulating the plurality of reflected waves received by each of the receive antenna elements;
    a prefilter that estimates a plurality of main arrival angles representing directions of the targets relative to the radar system using the at least three first received signals;
    a direction canceler that generates at least two first extracted signals by using the at least three first received signals to form nulls in eliminating arrival angles, which are all main arrival angles except one main arrival angle as an extracting arrival angle among the plurality of main arrival angles, in directional characteristics of the receive antenna; and
    an image generator that analyzes Doppler frequency components around the extracting arrival angle using the at least two first extracted signals and calculates scattering-center arrival angles which each represent the arrival angle for each Doppler frequency component analyzed,
    wherein the direction canceler sequentially changes the extracting arrival angle in response to a number of the plurality of main arrival angles estimated by the prefilter.

2. The radar system according to claim 1,
    wherein the direction canceler generates the at least two first extracted signals by canceling signals that are based on reflected waves that arrived at the receive antenna from eliminating arrival angles, and
    wherein the signals are canceled by using at least two sets of two out of the at least three first received signals in different combinations to sequentially generate nulls in the eliminating arrival angles in the directional characteristics of the receive antenna for each of the at least two sets.

3. The radar system according to claim 1,
    wherein the direction canceler further forms an additional null when the extracting arrival angle is a minimum or maximum of the plurality of main arrival angles, and
    wherein the extracting arrival angle substantially coincides with a midpoint between the direction of the additional null and the eliminating arrival angle that neighbors the extracting arrival angle.

4. The radar system according to claim 1,
    wherein the transmitter generates the radio wave by modulating a carrier wave with a pseudo-noise code, and
    wherein the receiver generates the at least three first received signals by demodulating each of the plurality of reflected waves with the pseudo-noise code.

5. The radar system according to claim 1,
    wherein the transmit antenna has a first transmit antenna element and a second transmit antenna element that are arranged in a direction intersecting with the plane of travel as the at least one transmit antenna element,
    wherein the transmitter generates a first radio wave which is the radio wave to be transmitted from the first transmit antenna element by modulating a carrier wave with a first pseudo-noise code and generates a second radio wave which is the radio wave to be transmitted from the second transmit antenna element by modulating the carrier wave with a second pseudo-noise code which is orthogonal to the first pseudo-noise code,
    wherein the receiver generates the at least three first received signals by demodulating each of the plurality of reflected waves with the first pseudo-noise code, and generates at least three second received signals by demodulating each of the reflected waves with the second pseudo-noise code,
    wherein the direction canceler further generates at least two second extracted signals using the at least three second received signals, and
    wherein the image generator further calculates the scattering-center arrival angles in a plane intersecting with the plane of travel using one of the at least two first extracted signals and one of the at least two second extracted signals.

6. A target detection method for detecting a plurality of targets using a radar system, comprising:
    generating a radio wave;
    transmitting the radio wave;

receiving a plurality of reflected waves resulting from the radio wave being reflected off the plurality of targets with at least three receive antenna elements arranged in a direction substantially parallel to a plane of travel of the targets;

generating at least three first received signals corresponding to the at least three receive antenna elements by demodulating the plurality of reflected waves received by each of the receive antenna elements;

estimating a plurality of main arrival angles representing directions of the targets relative to the radar system using the at least three first received signals;

generating at least two first extracted signals by using the at least three first received signals to form nulls in eliminating arrival angles, which are all main arrival angles except one main arrival angle as an extracting arrival angle among the plurality of main arrival angles, in directional characteristics of the receive antenna;

analyzing Doppler frequency components around the extracting arrival angle using the at least two first extracted signals; and calculating scattering-center arrival angles which each represent the arrival angle for each Doppler frequency component analyzed, wherein the generation of the at least two first extracted signals, the analysis of the Doppler frequency components, and the calculation of the scattering-center arrival angles are repeated with the extracting arrival angle sequentially changed in response to a number of the plurality of main arrival angles.

* * * * *